(12) United States Patent
Sakaue

(10) Patent No.: US 8,374,408 B2
(45) Date of Patent: Feb. 12, 2013

(54) IMAGE PROCESSING APPARATUS AND IMAGE PROCESSING METHOD, PROGRAM, AND STORAGE MEDIUM

(75) Inventor: Tsutomu Sakaue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/251,432

(22) Filed: Oct. 3, 2011

(65) Prior Publication Data

US 2012/0033265 A1 Feb. 9, 2012

Related U.S. Application Data

(63) Continuation of application No. 11/846,619, filed on Aug. 29, 2007, now Pat. No. 8,059,871.

(30) Foreign Application Priority Data

Dec. 5, 2006 (JP) ................................ 2006-328847

(51) Int. Cl.
*G06K 9/00* (2006.01)
*G06K 9/46* (2006.01)
*G06K 15/00* (2006.01)

(52) U.S. Cl. ........................................ 382/125; 382/190

(58) Field of Classification Search .................. 382/100, 382/124, 125, 190, 218–220, 306; 283/68–70; 356/71
See application file for complete search history.

(56) References Cited

U.S. PATENT DOCUMENTS

| | | | |
|---|---|---|---|
| 5,600,117 A * | 2/1997 | Sakamoto | 235/456 |
| 5,740,244 A * | 4/1998 | Indeck et al. | 713/176 |
| 5,974,150 A * | 10/1999 | Kaish et al. | 713/179 |
| 6,928,552 B1 * | 8/2005 | Mischenko et al. | 726/22 |
| 7,502,507 B2 * | 3/2009 | Wang et al. | 382/182 |
| 8,059,871 B2 * | 11/2011 | Sakaue | 382/125 |
| 2008/0003034 A1* | 1/2008 | Ihara | 400/62 |
| 2008/0130963 A1 | 6/2008 | Sakaue | |

FOREIGN PATENT DOCUMENTS

| | | |
|---|---|---|
| DE | 10204870 A1 | 8/2003 |
| JP | 9091416 | 4/1997 |
| JP | 2003209676 | 7/2003 |
| JP | 2004-102562 | 4/2004 |
| JP | 2004355566 | 12/2004 |
| JP | 2006237868 | 9/2006 |
| JP | 2006245949 | 9/2006 |
| WO | 97/24699 | 7/1997 |
| WO | 99/17486 | 4/1999 |
| WO | 2005/080088 | 9/2005 |
| WO | 2006/120643 | 11/2006 |

OTHER PUBLICATIONS

Official Letter/Search Report dated Jan. 31, 2008, issued by the European Patent Office, in European Patent Application No. 07116082.4.
Omura, Jim K., "Novel Applications of Cryptography in Digital Communications", IEEE Communications Magazine, pp. 21-29 (May 1990).
Haist, T., et al., "Optical Detection of Random Features for High Security Applications", Optics Communications, pp. 173-179, (Sep. 18, 1997).

\* cited by examiner

*Primary Examiner* — Amir Alavi

(74) *Attorney, Agent, or Firm* — Fitzpatrick, Cella, Harper & Scinto

(57) ABSTRACT

Paper fingerprint information that represents a fiber pattern unique to a paper sheet is scanned, and the paper fingerprint information and its position information are embedded at two corners as the cater-cornered positions on a paper sheet. The paper fingerprint information is extracted based on the embedded position information.

6 Claims, 33 Drawing Sheets

F I G. 4
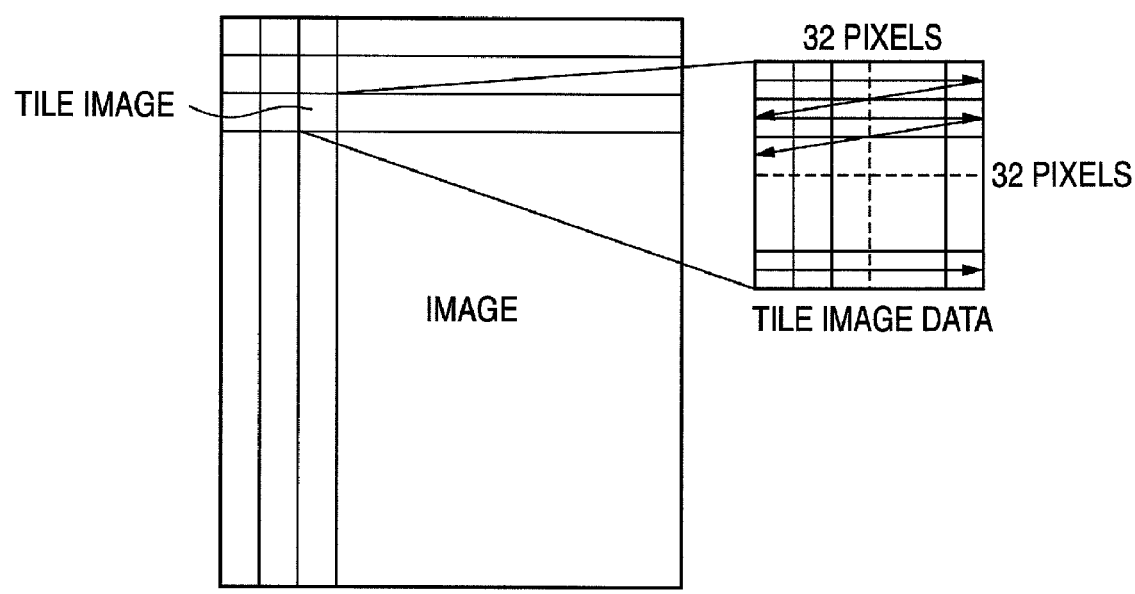

F I G. 14
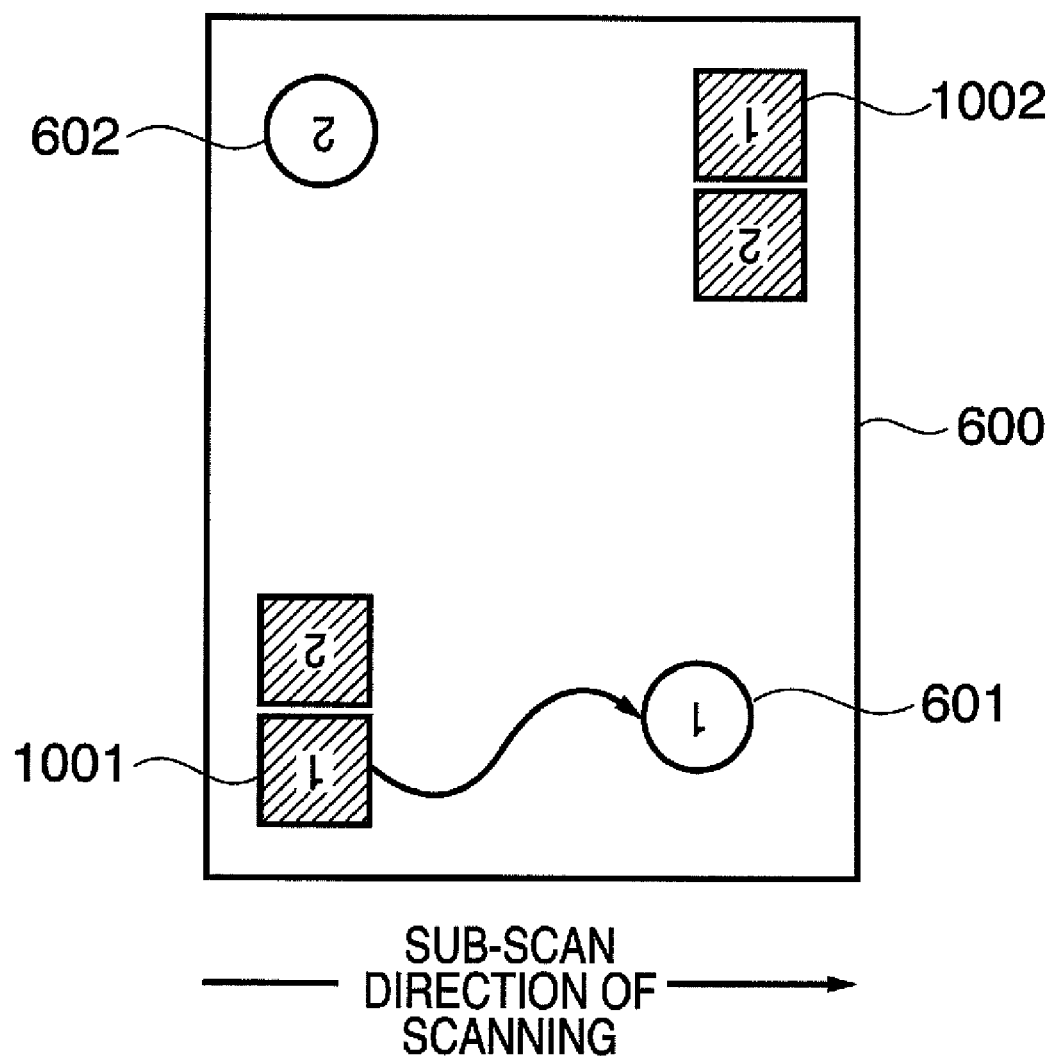

SUB-SCAN DIRECTION OF SCANNING

SUB-SCAN DIRECTION OF SCANNING →

SUB-SCAN DIRECTION OF SCANNING → ns

SUB-SCAN DIRECTION OF SCANNING →

SUB-SCAN DIRECTION OF SCANNING

SUB-SCAN
DIRECTION OF
SCANNING

SUB-SCAN
⟶ DIRECTION OF ⟶
SCANNING

SUB-SCAN
⟶ DIRECTION OF ⟶
SCANNING

SUB-SCAN
⟶ DIRECTION OF ⟶
SCANNING

SUB-SCAN
⟶ DIRECTION OF ⟶
SCANNING

IMAGE PROCESSING APPARATUS AND IMAGE PROCESSING METHOD, PROGRAM, AND STORAGE MEDIUM

This application is a continuation of U.S. patent application Ser. No. 11/846,619, filed Aug. 29, 2007, and allowed Aug. 1, 2011, now U.S. Pat. No. 8,059,871.

BACKGROUND OF THE INVENTION

1. Field of the Invention

The present invention relates to an image processing apparatus and image processing method, which process paper fingerprint information that represents a fiber pattern unique to a paper sheet, a program, and a storage medium.

2. Description of the Related Art

In recent years, with the prevalence of multi-function image processing apparatuses, the importance for security is growing. Such multi-function image processing apparatus are convenient, but they may cause leakage of confidential information and illegal document forgery depending on its use method. For this reason, a multi-function copying machine includes a forgery prevention device, copy guard function, and the like. Also, a technique which identifies features of paper itself and guarantees the uniqueness and originality of a document based on the identified features (e.g., see patent reference 1: Japanese Patent Laid-Open No. 2004-102562) has been developed.

Using the technique disclosed in patent reference 1, paper sheets can be identified one by one by identifying a fiber pattern unique to each paper sheet. However, upon giving priority to the ease and certainty of verification, the collection position of a fiber pattern (to be referred to as a paper fingerprint hereinafter) to be identified is fixed, thus posing a problem. Furthermore, when paper fingerprints are to be collected at a fixed position, the verification ratio decreases if a character or image is printed at that position upon verification.

To solve this problem, a method of specifying the collection position by forming a specific mark at the collection position in advance has been proposed. However, since the paper fingerprint position is specified by that mark, it is not preferable in terms of security since it is easy to falsify by cutout, pasting, blindfold, and the like.

SUMMARY OF THE INVENTION

The present invention realizes a technique to allow extraction of paper fingerprint information from an arbitrary location on a paper sheet and to prevent a third party from specifying that position.

According to one aspect of the present invention, there is provided an image processing apparatus for processing paper fingerprint information that represents a fiber pattern unique to a paper sheet, comprising: a scanner unit adapted to scan the paper fingerprint information that represents the fiber pattern unique to a paper sheet; an embedding unit adapted to embed the paper fingerprint information on the paper sheet and to embed position information concerning the paper fingerprint information at two diagonally opposite corners on the paper sheet; and an extraction unit adapted to extract the paper fingerprint information based on the embedded position information.

According to another aspect of the present invention, there is provided an image processing method for processing paper fingerprint information that represents a fiber pattern unique to a paper sheet, comprising: scanning the paper fingerprint information that represents the fiber pattern unique to a paper sheet; embedding the paper fingerprint information on the paper sheet and embedding position information concerning the paper fingerprint information at two diagonally opposite corners on the paper sheet; and extracting the paper fingerprint information based on the embedded position information.

Further features of the present invention will become apparent from the following description of exemplary embodiments with reference to the attached drawings.

BRIEF DESCRIPTION OF THE DRAWINGS

FIG. 4 is a view conceptually illustrating tile image data;

FIG. 14 is a view for explaining a method of extracting paper fingerprint information from a paper sheet;

DESCRIPTION OF THE EMBODIMENTS

The best mode of carrying out the invention will be described in detail hereinafter with reference to the accompanying drawings.

<System Arrangement (FIG. 1)>

Figure 1:
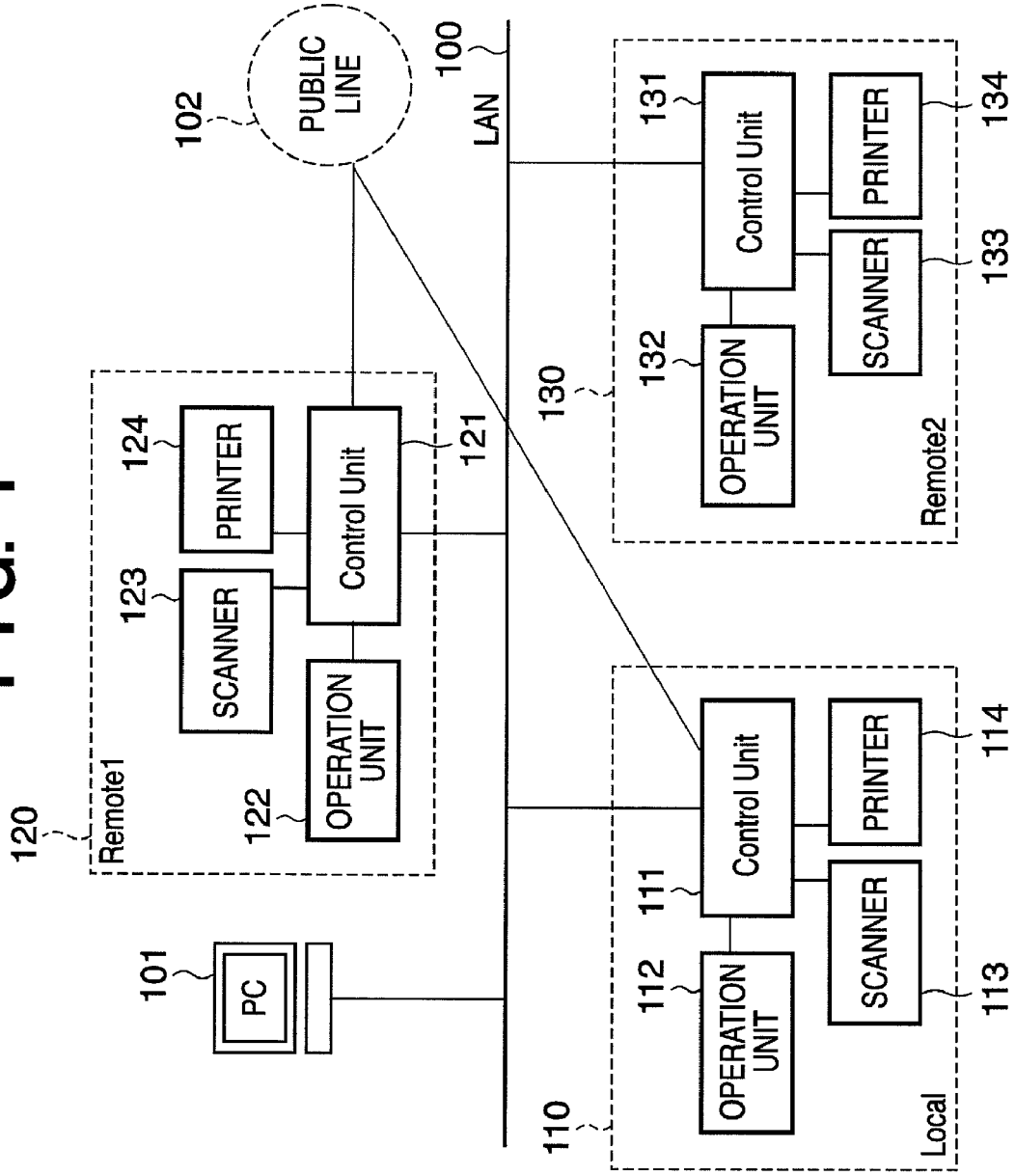
FIG. 1 is a block diagram showing the overall arrangement of an image forming system according to the first embodiment.

FIG. 1 is a block diagram showing the overall arrangement of an image forming system according to the first embodiment. As shown in FIG. 1, an image forming apparatus 110 comprises a scanner unit 113 as an image input device, a printer unit 114 as an image output device, a control unit 111, and an operation unit 112 as a user interface. The operation unit 112, scanner unit 113, and printer unit 114 are connected to the control unit 111, and are controlled according to instructions from the control unit 111. The control unit 111 is connected to network transmission means such as a local area network (LAN) 100 or the like, and a public line (WAN) 102. From the public line 102, G3 and G4 FAX send processes including color image send processes are allowed.

To the LAN 100, other image forming apparatuses 120 and 130 having the same device arrangements as that of the image forming apparatus 100 are also connected. That is, the image forming apparatus 120 comprises a scanner unit 123, printer unit 124, and operation unit 122, which are connected to and controlled by a control unit 121. The image forming apparatus 130 comprises a scanner unit 133, printer unit 134, and operation unit 132, which are connected to and controlled by a control unit 131.

A personal computer (PC) 101 is connected to the network transmission means such as the LAN 100 or the like. The personal computer 101 can exchange files and e-mail messages using standard file transfer protocols such as FTP, SMB, and the like.

<Outer Appearance of Image Forming Apparatus 110 (FIG. 2)>

Figure 2:
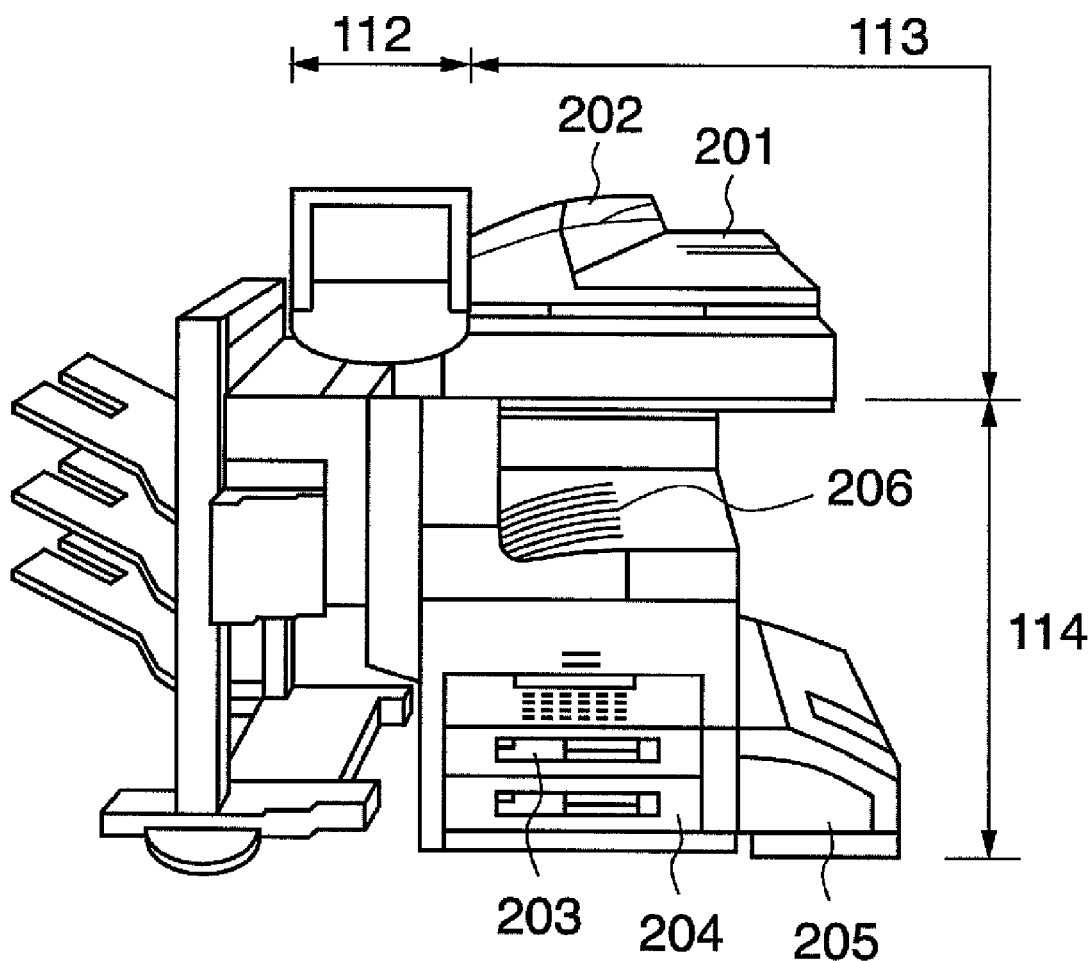
FIG. 2 is a perspective view showing an outer appearance of an image forming apparatus according to the first embodiment.

FIG. 2 shows the outer appearance of the image forming apparatus according to the first embodiment. The scanner unit 113 as the image input device shown in FIG. 2 comprises a plurality of CCDs. If these CCDs have different sensitivities, even when respective pixels on a document have the same density, these pixels are unwantedly recognized to have different densities. To avoid this, the scanner unit 113 exposes and scans a white plate (uniformly white plate) first, converts the amount of reflected light obtained by exposure scan into electrical signals, and outputs the electrical signals to the control unit 111.

Note that a shading correction unit (to be described later) in the control unit 111 recognizes the sensitivity differences of the respective CCDs based on the electrical signals obtained from the CCDs, and corrects the electrical signal values obtained by scanning an image on a document using the recognized sensitivity differences.

Furthermore, upon reception of gain control information from a CPU (to be described later) in the control unit 111, the shading correction unit (to be described later) executes gain control according to that information. This gain control is used to control how to assign electrical signal values obtained by exposing and scanning a document to luminance signal values ranging from 0 to 255. With this gain control, an electrical signal value obtained by exposing and scanning a document can be converted into a high luminance signal value or to a low luminance signal value.

The arrangement for scanning an image on a document will be described below. The scanner unit 113 converts information of an image into electrical signals by inputting reflected light obtained by exposing and scanning the image on a document to the CCDs. Furthermore, the scanner unit 113 converts electrical signals into luminance signals including R, G, and B colors, and outputs the luminance signals as image data to the control unit 111.

Note that a document is set on a tray 202 of a document feeder 201. When the user inputs a scan start instruction from the operation unit 112, the control unit 111 supplies a document scan instruction to the scanner unit 113. Upon reception of this instruction, the scanner unit 113 feeds documents one by one from the tray 202, and scans images on respective documents.

The document scan method is not limited to an automatic feed method using the document feeder 201. For example, a method of scanning a document by placing a document on a glass surface (not shown) and moving an exposure unit may be used.

On the other hand, the printer unit 114 is an image forming device which forms image data received from the control unit 111. Note that the printer unit 114 adopts, as an image forming system, an electrophotography system that uses a photosensitive drum or photosensitive belt. However, the present invention is not limited to this. For example, the printer unit 114 may adopt an ink-jet system that ejects ink from a micronozzle array to print an image on a paper sheet or the like. The printer unit 114 has a plurality of paper feed means to allow the user to select different paper sizes or different paper orientations, and comprises corresponding paper cassettes 203, 204, and 205. An exhaust tray 206 receives printed paper sheets.

<Details of Control Unit 111 (FIG. 3)>

Figure 3:
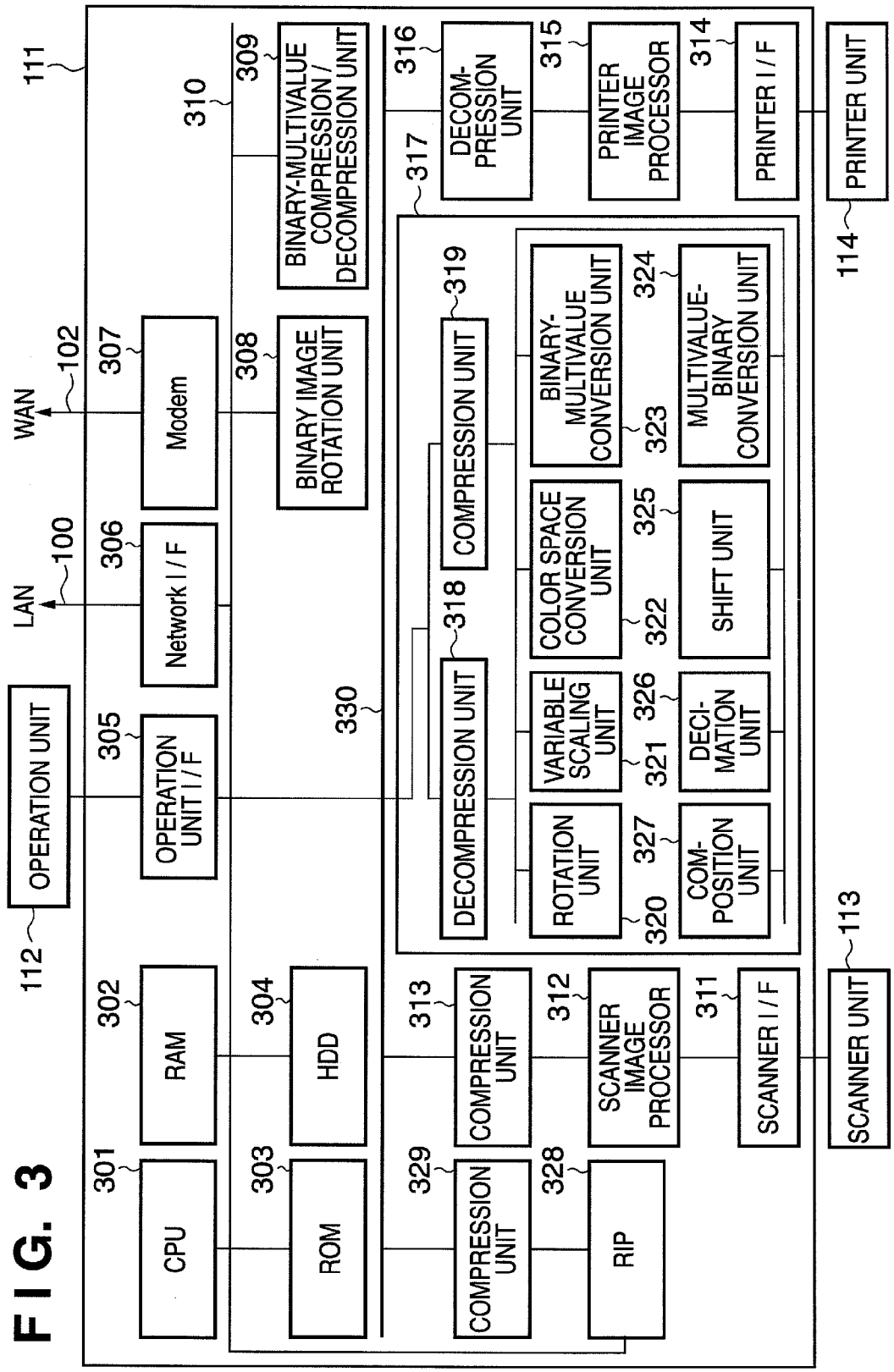
FIG. 3 is a block diagram showing the detailed arrangement of a control unit 111 in an image forming apparatus 110.

FIG. 3 is a block diagram showing the detailed arrangement of the control unit 111 in the image forming apparatus 110. The control unit 111 is electrically connected to the scanner unit 113 and printer unit 114, and also to the PC 101, external devices, and the like via the LAN 100 and the public line (WAN) 102. Thus, the control unit 111 inputs and outputs image data and device information.

In the control unit 111, a CPU 301 systematically controls accesses with various devices in connection based on programs and the like stored in a ROM 303, and also systematically controls various internal processes. A RAM 302 is a system work memory required to operate the CPU 301, and is a memory used to temporarily store image data. This RAM 302 comprises an SRAM which holds the stored contents even after power OFF, and a DRAM whose contents are cleared after power OFF. The ROM 303 stores a boot program, control data, and the like of the apparatus. An HDD 304 is a hard disk drive, which stores system software and image data.

An operation unit I/F 305 is an interface unit required to connect a system bus 310 and the operation unit 112. The operation unit I/F 305 receives image data to be displayed on the operation unit 112 from the system bus 310, and outputs it to the operation unit 112. Also, the operation unit I/F 305 outputs information input from the operation unit 112 onto the system bus 310.

A network (Network) I/F 306 controls connections with the LAN 100, and inputs and outputs information to and from the LAN 100. A modem (MODEM) 307 controls connections with the WAN 102, and inputs and outputs information to and from the WAN 102. A binary image rotation unit 308 converts the direction of image data before the modem 307 sends a binary image. A binary image compression/decompression unit 309 converts the resolution of image data before sending into a predetermined resolution or a resolution that fits the partner's performance. The compression and decompression support schemes such as JBIG, MMR, MR, MH, and the like.

An image bus 330 is a transmission path used to exchange image data, and comprises a PCI bus or IEEE1394. A scanner image processor 312 connected to the image bus 330 corrects, modifies, and edits image data received from the scanner unit 113 via a scanner I/F 311.

Note that the scanner image processor 312 checks if the received image data represents a color or monochrome document, or a text or photo document. The scanner image processor 312 appends the checking result to the image data. This appended information will be referred to as attribute data hereinafter. Details of the processing executed by the scanner image processor 312 will be described later.

A compression unit 313 receives image data, and segments this image data into blocks each including 32×32 pixels. Note that image data of 32×32 pixels will be referred to as tile image data hereinafter.

FIG. 4 conceptually illustrates tile image data. On a document (paper medium before scanning), an area corresponding to this tile image data will be referred to as a tile image hereinafter. The tile image data is appended as header information with average luminance information in a block of 32×32 pixels, and the coordinate position of the tile image on the document.

Furthermore, the compression unit 313 compresses image data including a plurality of tile image data. A decompression unit 316 decompresses image data including a plurality of tile image data, rasterizes the decompressed image data, and supplies the rasterized image data to a printer image processor 315.

The printer image processor 315 receives image data supplied from the decompression unit 316, and applies image processes to that image data with reference to attribute information appended to the image data. The image data after the image processes is output to the printer unit 114 via a printer I/F 314. Details of the processing executed by the printer image processor 315 will be described later.

An image conversion unit 317 applies predetermined conversion processing to image data. This conversion unit comprises the following processors.

A decompression unit 318 decompresses received image data. A compression unit 319 compresses received image data. A rotation unit 320 rotates received image data. A conversion unit 321 applies to received image data resolution conversion processing from, e.g., 600 dpi to 200 dpi and variable scaling processing from, e.g., 25% to 400%. Before the variable scaling processing, the conversion unit 321 rearranges images of 32×32 pixels to those in a 32-line unit.

A color space conversion unit 322 converts the color space of received image data. This color space conversion unit 322 executes known undercolor removal processing, known LOG conversion processing (RGB→CMY), and known output color correction processing (CMY→CMYK) using matrices or tables. A binary-multivalue conversion unit 323 converts received binary image data into image data of 256 tone levels. Conversely, a multivalue-binary conversion unit 324 converts received image data of 256 tone levels into binary image data by a scheme such as error diffusion or the like.

A composition unit 327 composites two sets of received image data to generate one set of image data. Upon compositing the two sets of image data, a method of determining the average value of luminance values of pixels to be composited to be a composite luminance value, or a method of determining the luminance value of a lighter pixel in terms of the luminance level as that of a composite pixel is applied. Also, a method of determining the luminance value of a darker pixel as that of a composite pixel may be used. Furthermore, a method of determining a composite luminance value by calculating an OR, AND, EX-OR, or the like of pixels to be composited may be applied. These composition methods are known to those who are skilled in the art.

A decimation unit 326 implements resolution conversion by decimating pixels of received image data to generate ½, ¼, or ⅛ image data. A shift unit 325 adds or deletes a margin part to or from received image data.

A raster image processor (RIP) 328 receives intermediate data which is sent from the PC 101 or the like and is generated based on PDL code data, and rasterizes the intermediate data to bitmap data (multivalued data).

<Details of Scanner Image Processor 312 (FIG. 5)>

Figure 5:
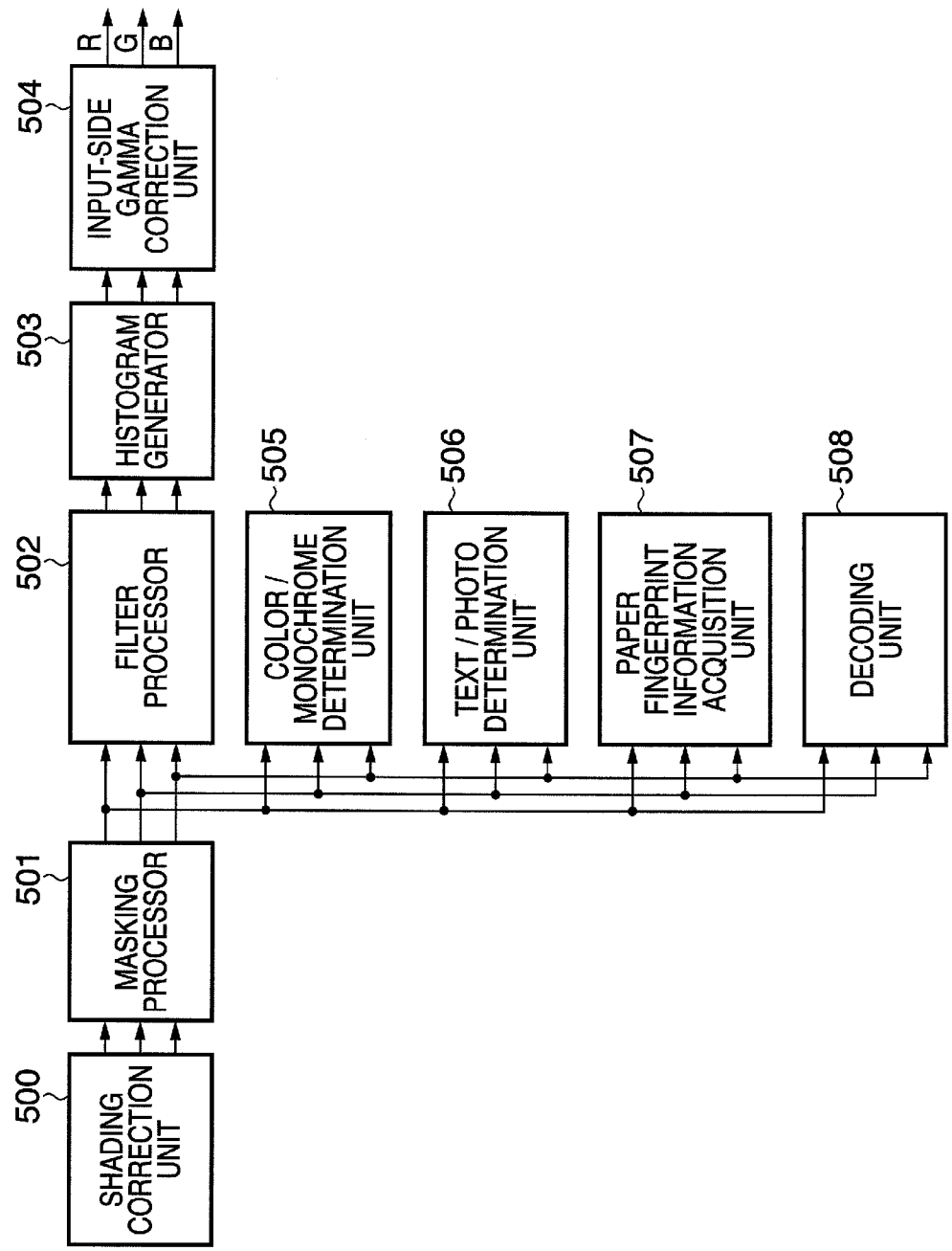
FIG. 5 is a block diagram showing an example of the arrangement of a scanner image processor 312 shown in FIG. 3.

FIG. 5 is a block diagram showing an example of the arrangement of the scanner image processor 312 shown in FIG. 3. The scanner image processor 312 receives R, G, and B 8-bit luminance signals as input image data. A shading correction unit 500 applies shading correction to these luminance signals. The shading correction is processing for preventing any recognition errors of the brightness of a document due to sensitivity variations of the CCDs, as described above. Also, this shading correction unit 500 can execute gain control in accordance with an instruction from the CPU 301, as described above.

A masking processor 501 converts the luminance signals that have undergone the shading correction into standard luminance signals which do not depend on the filter colors of the CCDs. A filter processor 502 arbitrarily corrects the spatial frequency of received image data. More specifically, the filter processor 502 applies arithmetic processing using, e.g., a 7×7 matrix to the received image data.

In a copying machine or multi-function peripheral, by pressing a tab 2104 on an operation window shown in FIG. 21 (to be described later), the user can select one of a text mode, photo mode, and text/photo mode as a copy mode.

When the user selects the text mode, the filter processor 502 applies a text filter to the entire image data. When the user selects the photo mode, the filter processor 502 applies a photo filter to the entire image data. Alternatively, when the user selects the text/photo mode, the filter processor 502 adaptively switches the filters for respective pixels in accordance with text/photo determination signals (to be described later: part of attribute data). That is, whether to apply the photo or text filter is determined for each pixel.

Note that the photo filter is set with coefficients so as to smooth only high-frequency components. This is to obscure the granularity of an image. Also, the text filter is set with coefficients to apply relatively strong edge emphasis. This is to enhance the sharpness of characters.

A histogram generator 503 samples luminance data of respective pixels which form received image data. More specifically, the histogram generator 503 samples luminance data in a rectangular area, which is bounded by start and end points respectively designated in a main scan direction and sub-scan direction, in the main scan direction and sub-scan direction at a predetermined pitch. The histogram generator 503 then generates histogram data based on the sampling result. The generated histogram data is used to estimate a background level upon execution of the undercolor removal processing. An input-side gamma correction unit 504 converts into luminance data with nonlinear characteristics using a table or the like.

A color/monochrome determination unit 505 determines if each pixel which forms received image data is a chromatic or achromatic pixel, and appends the determination result to the image data as a color/monochrome determination signal (part of attribute data).

A text/photo determination unit 506 determines based on the pixel value of a pixel of interest and those of pixels around the pixel of interest if the pixel of interest which forms image data is a pixel that forms a character, a pixel that forms a halftone dot, a pixel that forms a character in a halftone dot pattern, or a pixel that forms a solid image. Note that a pixel other than these kinds of pixels is a pixel which forms a white area. The text/photo determination unit 506 appends this determination result to image data as a text/photo determination signal (part of attribute data).

Figure 6:
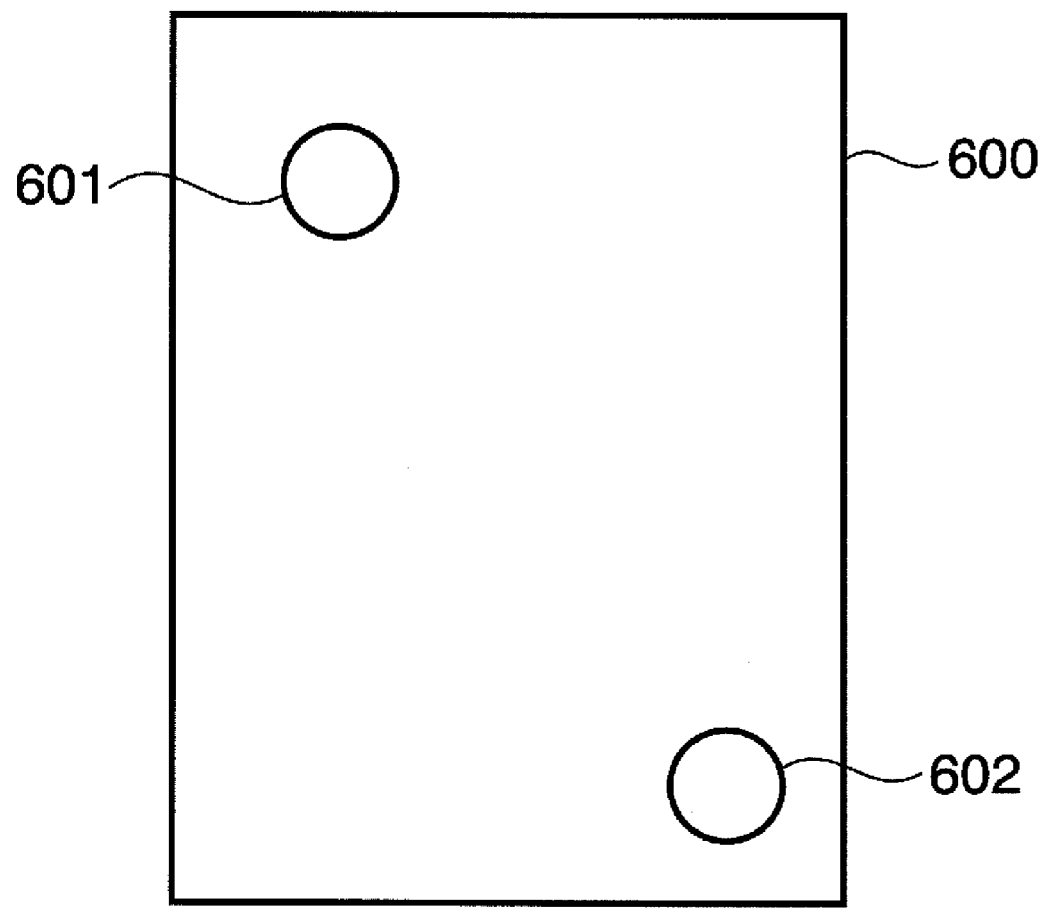
FIG. 6 shows collection areas of a fiber pattern (paper fingerprint) unique to a paper sheet.

A paper fingerprint information acquisition unit 507 collects image data of a predetermined area from input RGB image data as a fiber pattern (paper fingerprint) unique to a paper sheet. FIG. 6 shows collection areas of a fiber pattern (paper fingerprint) unique to a paper sheet. In FIG. 6, reference numeral 600 denotes an A4 paper sheet. Paper fingerprints are collected from areas 601 and 602 in the paper sheet 600.

Figure 7:
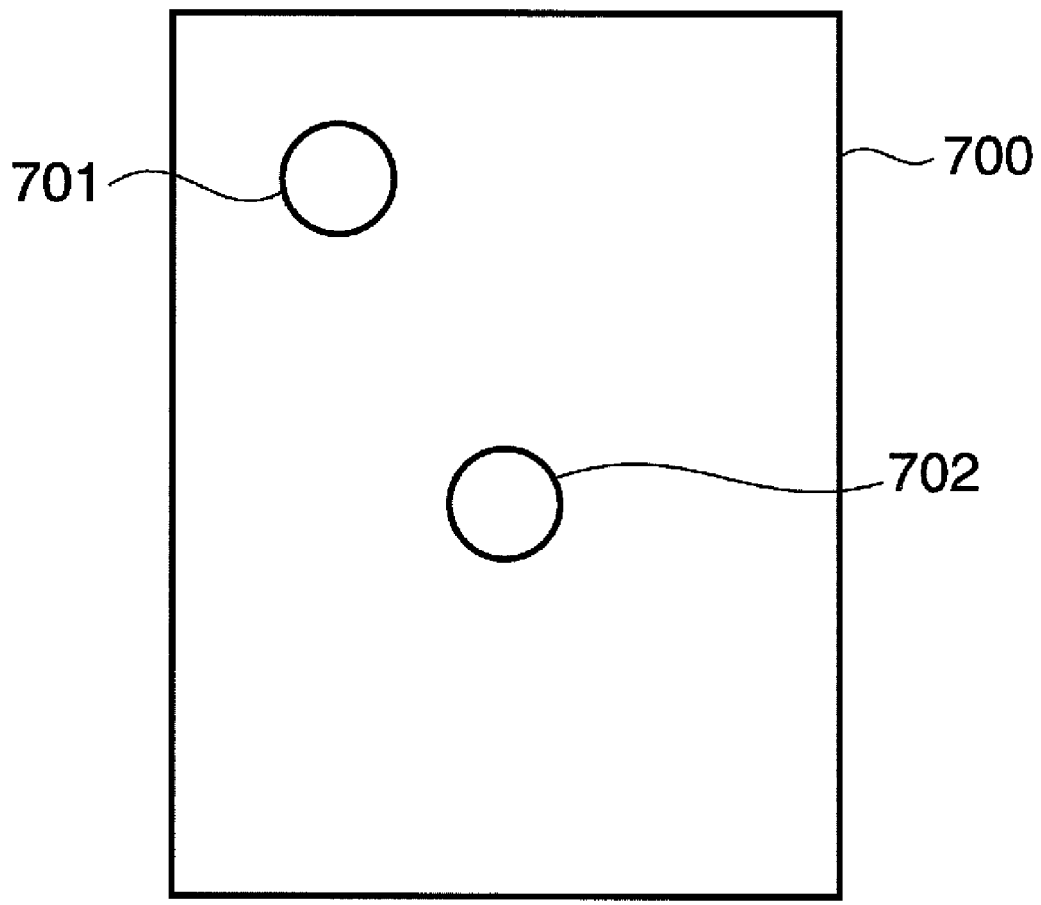
FIG. 7 shows other collection areas of a fiber pattern (paper fingerprint) unique to a paper sheet.

Note that the paper fingerprint collection areas 601 and 602 are not specified at the positions shown in FIG. 6, but areas 701 and 702 in a paper sheet 700 shown in FIG. 7 may be used. The number of collection areas may be one. However, in consideration of convenience upon verification and improvement of determination precision, it is desired to collect paper fingerprints from two or more distant areas which do not neighbor each other. At this time, the positions of the collection areas are stored.

Figure 8:
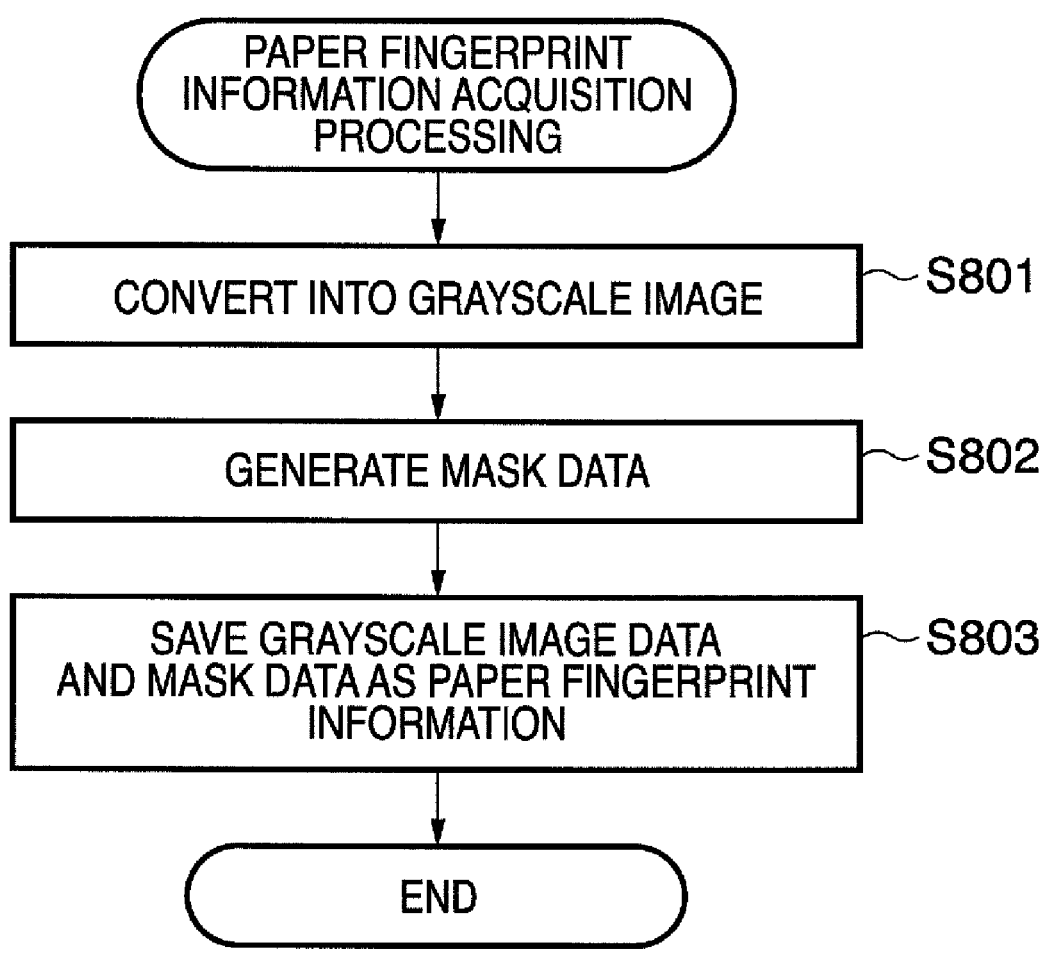
FIG. 8 is a flowchart showing the paper fingerprint information acquisition processing in a paper fingerprint information acquisition unit 507.

FIG. 8 is a flowchart showing the paper fingerprint information acquisition processing in the paper fingerprint information acquisition unit 507. In step S801, image data collected from the areas shown in FIG. 6 by the paper fingerprint information acquisition unit 507 are converted into grayscale image data. In step S802, mask data used to remove factors of determination errors such as printed or handwritten characters and the like are generated based on the grayscale image data. In the grayscale image data, for a pixel whose luminance signal value is equal to or higher than a first threshold (i.e., a light pixel), a mask data value is set to be "1". On the other hand, for a pixel whose luminance signal value is less than the first threshold, a mask data value is set to be "0". This mask data generation processing is applied to all pixels included in the grayscale image data.

In step S803, the grayscale image data converted in step S801 and the mask data generated in step S802 are saved in the RAM 302 as paper fingerprint information. The paper fingerprint information acquisition unit 507 saves the paper fingerprint information of each predetermined area described above in the RAM 302 via a data bus (not shown).

Referring back to FIG. 5, a decoding unit 508 checks if the image data output from the masking processor 501 includes encoded image data. If the encoded image data is included, the decoding unit 508 decodes that encoded image data to extract information.

<Details of Printer Image Processor 315 (FIG. 9)>

Figure 9:
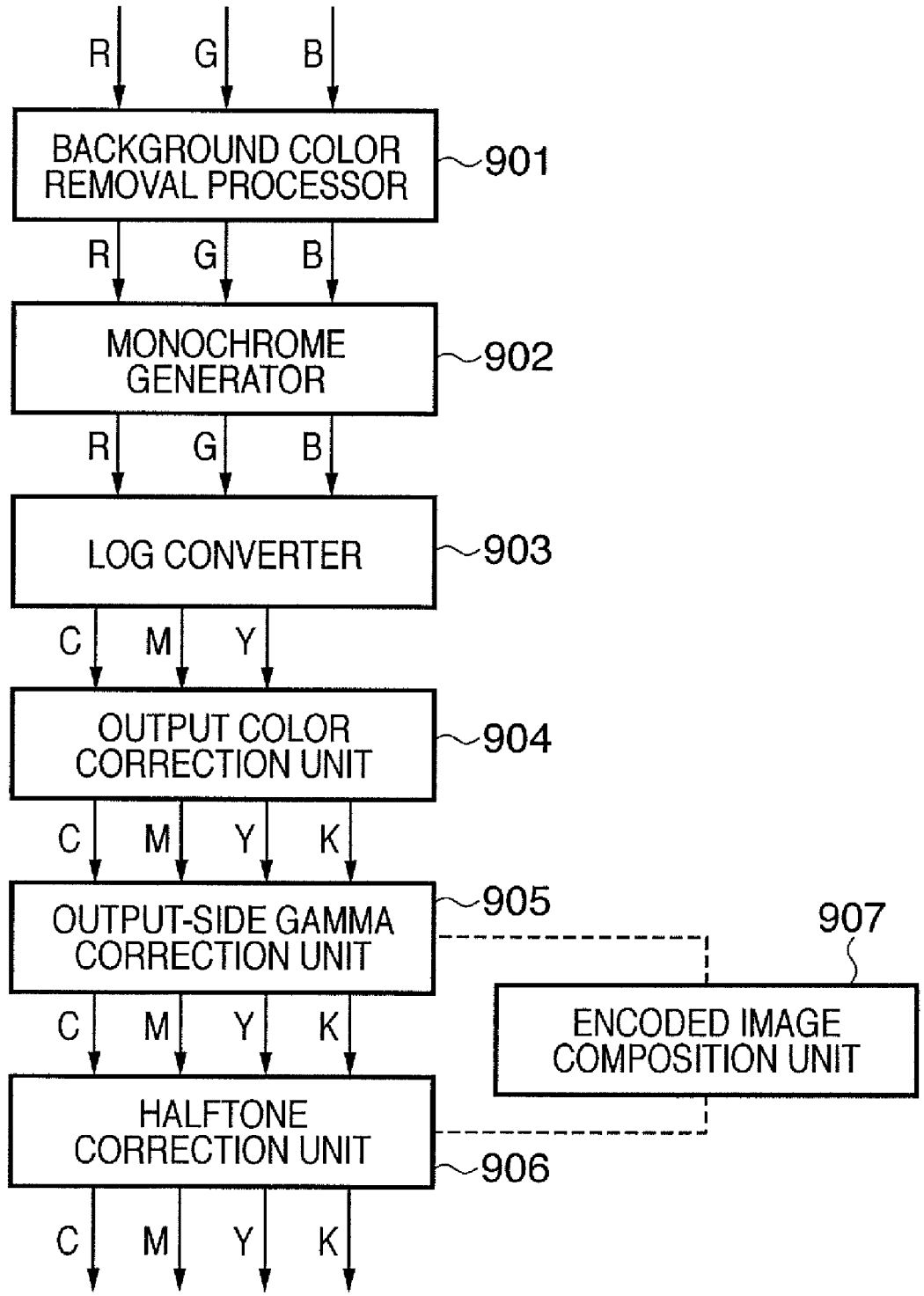
FIG. 9 is a block diagram showing an example of the arrangement of a printer image processor 315 shown in FIG. 3.

FIG. 9 is a block diagram showing an example of the arrangement of the printer image processor 315 shown in FIG. 3. An background color removal processor 901 removes the background color of image data using the histogram data generated by the histogram generator 503 of the scanner image processor 312. A monochrome generator 902 converts input color image data into monochrome image data. A Log converter 903 performs luminance-density conversion of input image data. This Log converter 903 converts, e.g., RGB image data into CMY image data.

An output color correction unit 904 performs output color correction. For example, the output color correction unit 904 converts, e.g., CMY image data into CMYK image data using a table or matrix. An output-side gamma correction unit 905 corrects the CMYK image data so that CMYK image data values are in proportion to reflection density values after copy output. A halftone correction unit 906 applies halftone processing in correspondence with the number of tones of the printer unit which outputs an image. For example, the halftone correction unit 906 applies binary conversion, 32-valued conversion, or the like to received image data with many tone levels.

An encoded image composition unit 907 composites the (document) image data corrected by the output-side gamma correction unit 905 and encoded image data generated by <paper fingerprint information encoding processing> (to be described later). Examples of the composition positions of encoded image data will be explained below with reference to FIGS. 10 and 11.

Figure 10:
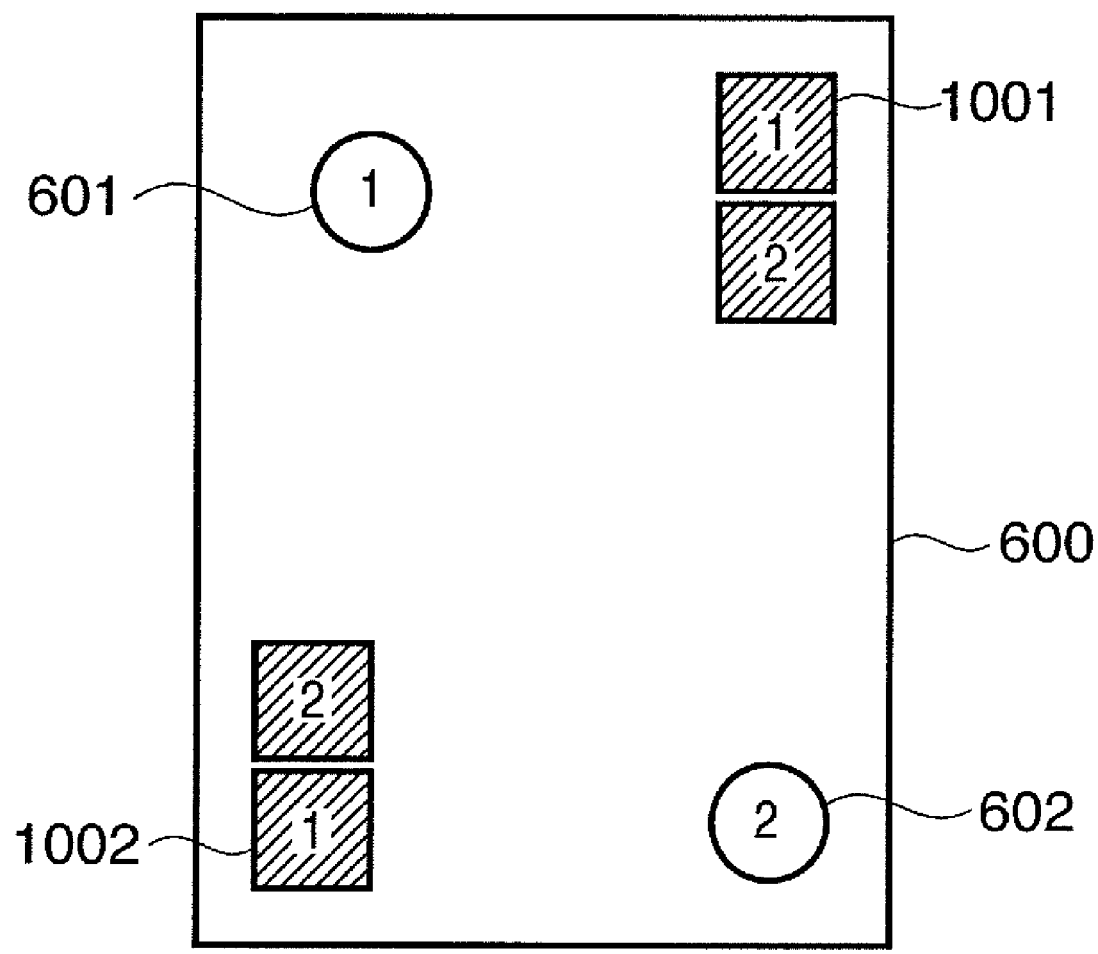
FIG. 10 shows a state in which encoded image data is allocated on a paper sheet 600 shown in FIG. 6.

FIG. 10 shows an example of a state in which encoded image data is allocated on the paper sheet 600 shown in FIG. 6. In the example shown in FIG. 10, encoded image data are allocated at two diagonally opposite locations in the paper sheet. In this example, reference numerals 1001 and 1002 correspond to encoded image data. In these encoded image data, the position information of each of the areas 601 and 602 is appended. Note that the position information may be composited independently from the encoded image data. The position data may be either visible or invisible.

Figure 11:
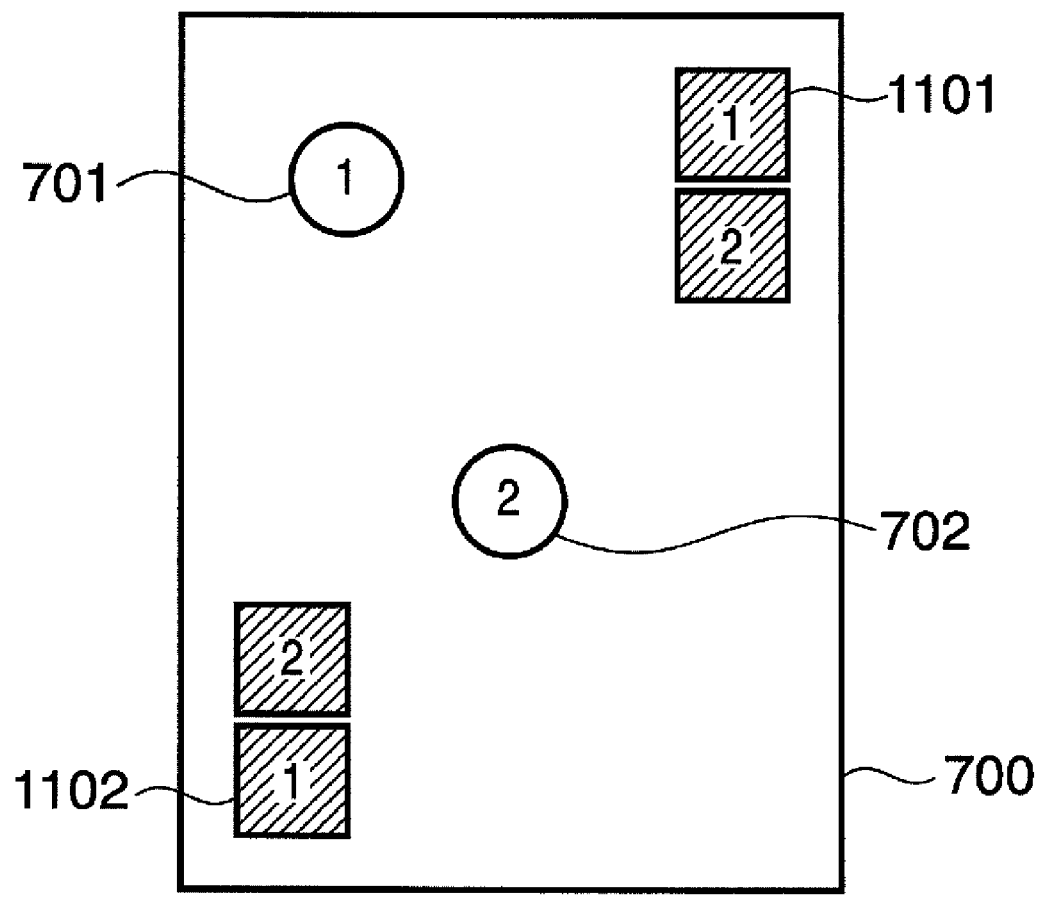
FIG. 11 shows a state in which encoded image data is allocated on a paper sheet 700 shown in FIG. 7.

FIG. 11 shows an example of a state in which encoded image data is allocated on the paper sheet 700 shown in FIG. 7. In the example shown in FIG. 11, encoded image data are allocated at two cater-cornered locations in the paper sheet. In this example, reference numerals 1101 and 1102 correspond to encoded image data. As in FIG. 10, the position information is appended.

In order to associate the paper fingerprint collection areas with the positions of the encoded image data, an operator sets a paper sheet according to an instruction on the operation unit. More specifically, after the scan process for acquiring paper fingerprint information and registration of the paper fingerprint information in the RAM 302, the operator sets a paper sheet in each of the paper cassettes 203 to 205 or a manual insert tray (not shown) to have an instructed direction (facing up or down, portrait or landscape, and the like) displayed on a field 2101 shown in FIG. 21 (to be described later).

A reader (not shown) may be set on the way where a paper sheet is conveyed from each of the paper cassettes 203 to 205 upon printing, and may collect and encode paper fingerprints there. After that, the encoded image data and image data may be composited and printed.

Note that the respective processors in the scanner image processor 312 and printer image processor 315 need not apply any processes to received image and may output the image data intact. In the following description, passing data without any processing by a given processor will be expressed as "to pass data through the processor".

<Paper Fingerprint Encoding Processing>

Next, the CPU 301 reads out the paper fingerprint information of the predetermined area saved in the RAM 302 by the paper fingerprint information acquisition unit 507 and encodes that paper fingerprint information to generate encoded image data.

In the first embodiment, an encoded image indicates an image such as a two-dimensional code image or barcode image.

The CPU 301 sends the generated encoded image data to the encoded image composition unit 907 in the printer image processor 315 via the data bus (not shown).

Note that the aforementioned encoding processing and send processing are implemented when the CPU 301 executes programs stored in the RAM 302.

<Paper Fingerprint Information Verification Processing>

The CPU 301 reads out the paper fingerprint information which is processed and saved in the RAM 302 by the paper fingerprint information acquisition unit 507, and verifies that paper fingerprint information with another paper fingerprint information.

Note that another paper fingerprint information means paper fingerprint information which is included in the aforementioned encoded image data or which is registered in a server (not shown) connected to the LAN 100. An extraction method of paper fingerprint information included in the encoded image data will be explained in <paper fingerprint extraction processing> to be described later.

Figure 12:
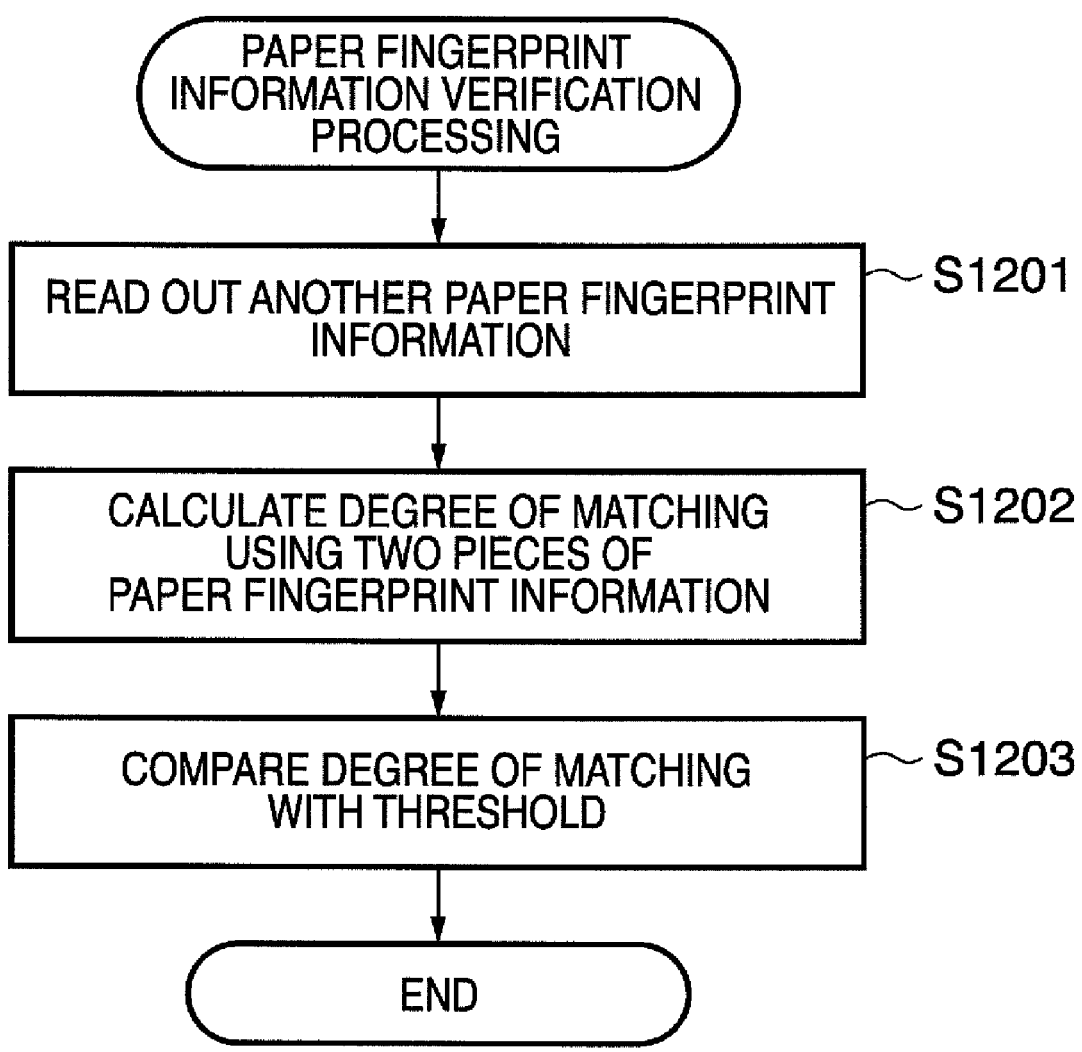
FIG. 12 is a flowchart showing the paper fingerprint information verification processing according to the first embodiment.

FIG. 12 is a flowchart showing the paper fingerprint information verification processing in the first embodiment. The CPU 301 systematically controls this processing.

In step S1201, the CPU 301 reads out paper fingerprint information included in the encoded image data or registered in the server.

$$E(i, j) = \frac{\sum_{x,y} \alpha1(x, y)\alpha2(x-i, y-j)\{f1(x, y) - f2(x, y)\}^2}{\sum_{x,y} \alpha1(x, y)\alpha2(x-i, y-j)} \quad (1)$$

where α1 is mask data in the (registered) paper fingerprint information read out in step S1201, f1 is grayscale image data in the (registered) paper fingerprint information read out in step S1201, α2 is mask data in paper fingerprint information (read out just now) sent from the paper fingerprint information acquisition unit 507 in step S1202, and f2 is grayscale image data in paper fingerprint information (read out just now) sent from the paper fingerprint information acquisition unit 507 in step S1202.

Figure 30A:
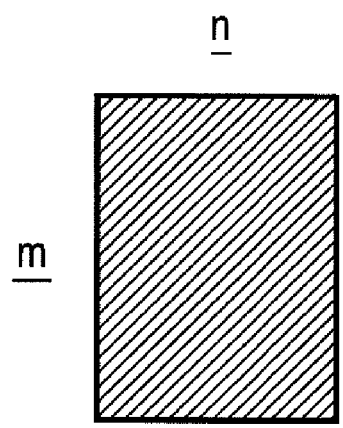
FIG. 30A shows registered paper fingerprint information.
Figure 30B:
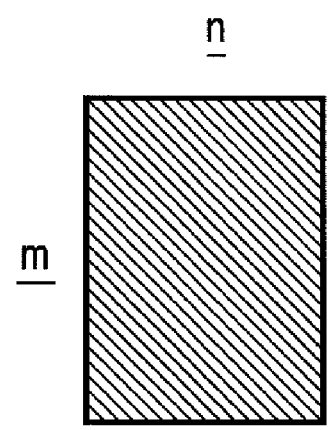
FIG. 30B shows currently obtained paper fingerprint information.

A practical method will be explained below with reference to FIGS. 30A and 30B to FIGS. 33A to 33B. FIG. 30A shows an image of registered paper fingerprint information, and FIG. 30B shows an image of currently obtained paper fingerprint information. Assume that each paper fingerprint information is configured by n pixels (horizontal)×m pixels (vertical).

In the function given by equation (1) above, i and j are shifted pixel by pixel within ranges from −n+1 to n−1 and −m+1 to m−1 to calculate (2n−1)×(2m−1) error values E(i, j) between the registered paper fingerprint information and the currently obtained paper fingerprint information. That is, E(−n+1, −m+1) to E(n−1, m−1) are calculated.

Figures 31A, 31B:
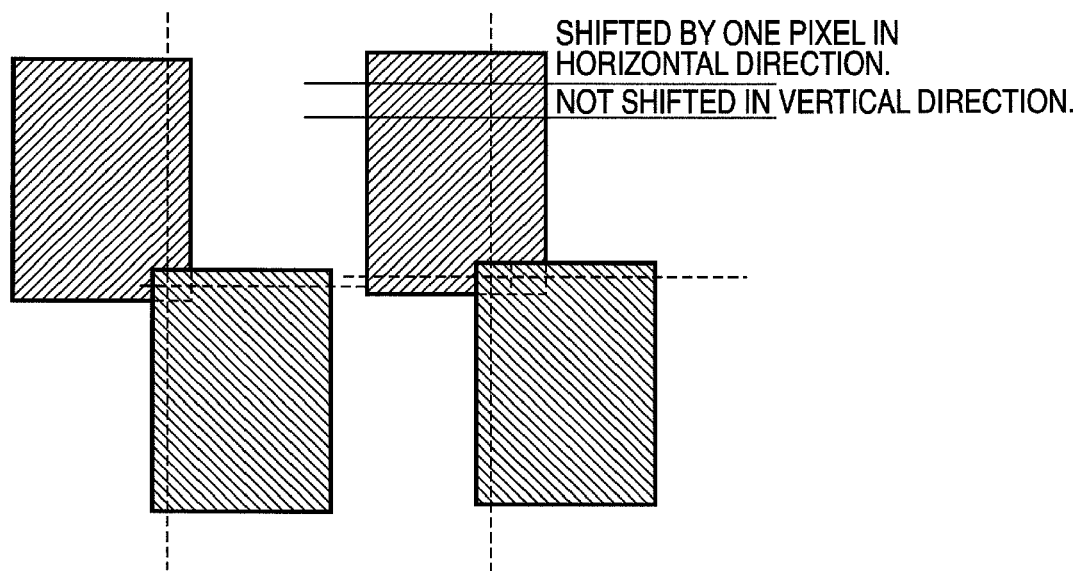
FIG. 31A shows a method of calculating $E_{1\times1}$.
FIG. 31B shows a method of calculating $E_{2\times1}$.
Figures 31C, 31D:
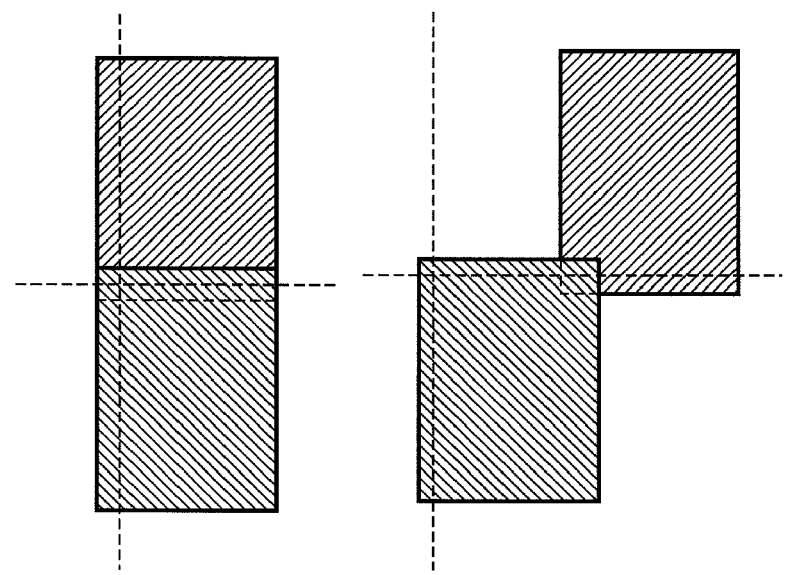
FIG. 31C shows a method of calculating $E_{n\times1}$.
FIG. 31D shows a method of calculating $E_{2n-1\times1}$.

FIG. 31A shows an image in which only one lower right pixel of the currently obtained paper fingerprint information overlaps one upper left pixel of the registered paper fingerprint information. Let E(−n+1, −m+1) be the value calculated by the function of equation (1) in this state. FIG. 31B shows an image in which the currently obtained paper fingerprint information is shifted by one pixel to the right from FIG. 31. Let E(−n+2, −m+1) be the value calculated by the function of equation (1) in this state. Likewise, arithmetic operations are made while shifting the currently obtained paper fingerprint information. In FIG. 31C, the currently obtained paper fingerprint information is shifted to a position where it overlaps the registered paper fingerprint information to calculate E(0, −(m−1)). Furthermore, in FIG. 31D, the currently obtained paper fingerprint information is shifted to the right end to calculate E(n−1, −m+1). In this way, when the currently obtained paper fingerprint information is shifted in the horizontal direction, i of E(i, j) is incremented by "1".

Figures 32A, 32B:
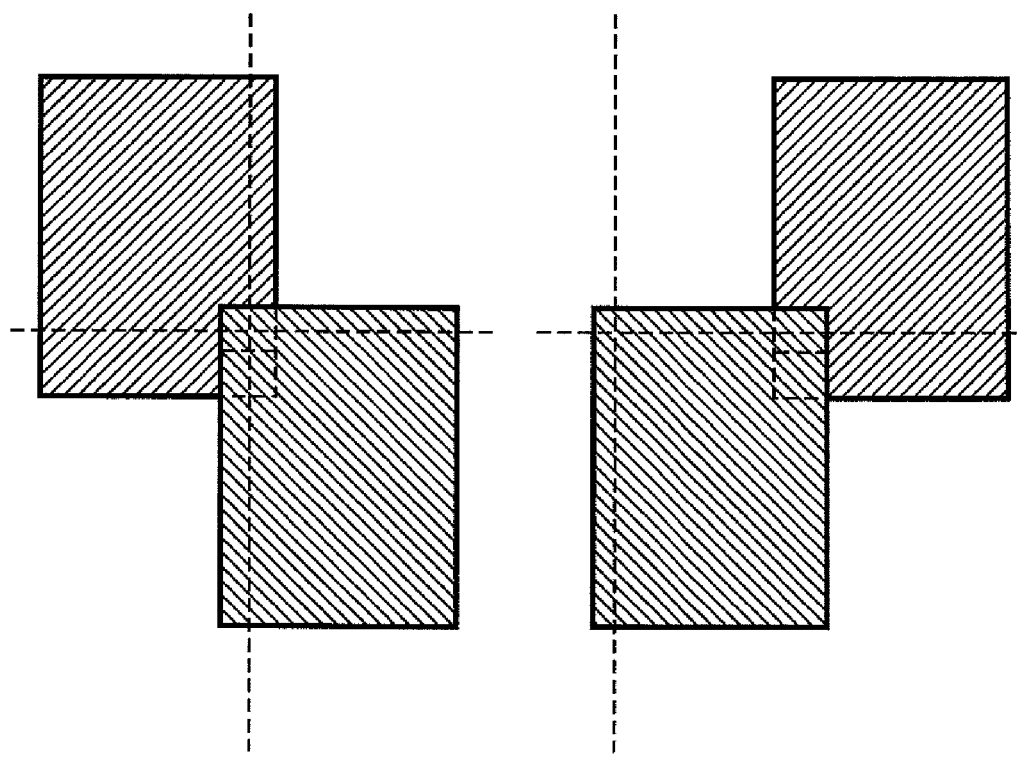
FIG. 32A shows a method of calculating $E_{1\times2}$.
FIG. 32B shows a method of calculating $E_{2n-1\times2}$.

Likewise, in FIG. 32A, the currently obtained paper fingerprint information is shifted by only one pixel downward as the vertical direction from FIG. 31A to calculate a value E(−n+1, −m+2).

Furthermore, in FIG. 32B, the currently obtained paper fingerprint information is shifted from FIG. 32A to the right end to calculate a value E(n−1, −m+2).

Figure 33A:
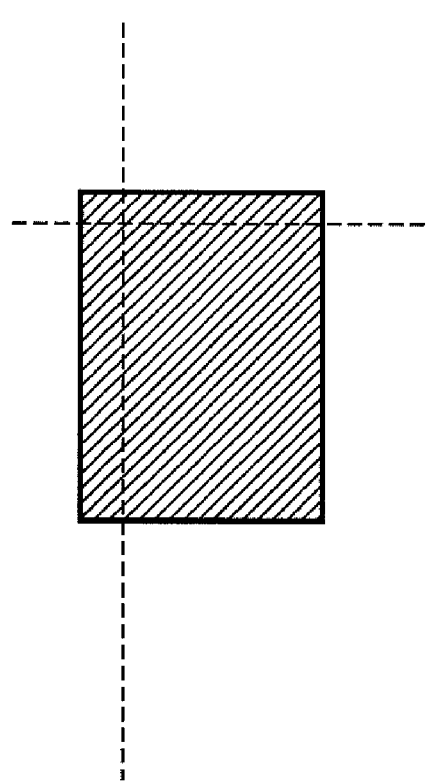
FIG. 33A shows a method of calculating $E_{n\times m}$.

FIG. 33A shows a case wherein the registered paper fingerprint information and the currently obtained paper fingerprint information are located at the same position, and let E(0, 0) be the value of E(i, j) in this case.

Figure 33B:
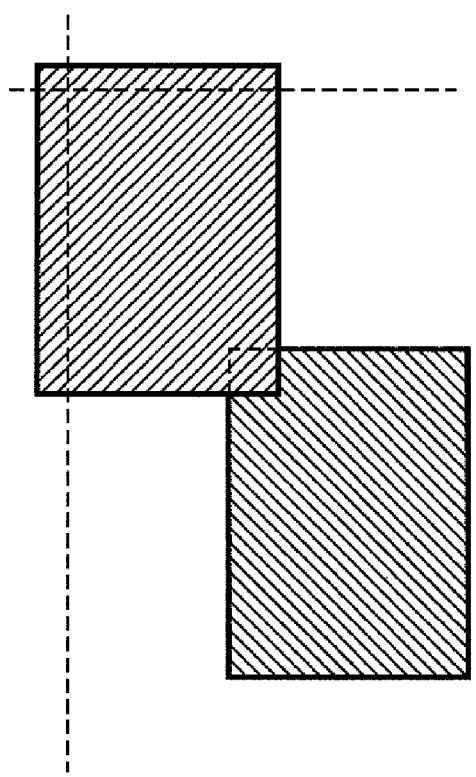
FIG. 33B shows a method of calculating $E_{2n-1\times2m-1}$.

Likewise, arithmetic operations are made while shifting an image so that the two pieces of paper fingerprint information overlap each other by at least one pixel or more. Finally, as shown in FIG. 33B, E(n−1, m−1) is calculated.

In this way, a set of (2n−1)×(2m−1) error values E(i, j) is calculated.

In order to examine the significance of equation (1) above, a case will be examined below wherein i=0 and j=0, and α1(x, y)=1 (for x=0 to n and y=0 to m), and α2(x−i, y−j)=1 (for x=0 to n and y=0 to m). That is, E(0, 0) when α1(x, y)=1 (for x=0 to n and y=0 to m) and α2(x−i, y−j)=1 (for x=0 to n and y=0 to m) is to be calculated.

Note that i=0 and j=0 indicate that the registered paper fingerprint information and the currently obtained paper fingerprint information are located at the same position, as shown in FIG. 33A.

Note that α1(x, y)=1 (for x=0 to n and y=0 to m) indicates that all pixels of the registered paper fingerprint information are light. In other words, at the time of acquisition of the registered paper fingerprint information, neither color materials such as toner, ink, or the like nor dust was on the paper fingerprint acquisition area.

Also, α2(x−i, y−j)=1 (for x=0 to n and y=0 to m) indicates that all pixels of the currently acquired paper fingerprint information are light. In other words, at the time of acquisition of the currently obtained paper fingerprint information, neither color materials such as toner, ink, or the like nor dust was on the paper fingerprint acquisition area.

In this way, when $\forall 1(x, y)=1$ and $\forall 2(x-i, y-j)=1$ hold for all pixels, equation (1) above is rewritten as:

$$E(0, 0) = \sum_{x=1, y=0}^{n,m} \{f1(x, y) - f2(x, y)\}^2$$

This $\{f1(x, y)-f2(x, y)\}^2$ indicates the square value of the difference between the grayscale image data in the registered paper fingerprint information and that in the currently extracted paper fingerprint information. Therefore, equation (1) represents the total of squares of the differences between pixels of the two pieces of paper fingerprint information. That is, $E(0, 0)$ assumes a smaller value with increasing number of pixels whose $f1(x, y)$ and $f2(x, y)$ are similar to each other.

The method of calculating $E(0, 0)$ has been explained. Likewise, other $E(i, j)$ values are calculated. In this connection, $E(i, j)$ assumes a smaller value with increasing number of pixels whose $f1(x, y)$ and $f2(x, y)$ are similar to each other.

If $E(k, l)=\min\{E(i, j)\}$, it reveals that the acquisition position of the registered paper fingerprint information and that of the currently acquired paper fingerprint information are shifted from each other by k and l.

<Meaning of α>

The numerator of equation (1) means the product of $\{f1(x, y)-f2(x-i, y-j)\}^2$ by α1 and α2 (strictly speaking, the total value is calculated by Σ symbol). These α1 and α2 indicate "0" for a pixel with a dark color and "1" for a pixel with a light color.

Therefore, when either (or both) of α1 and α2 is zero, $α1α2\{f1(x, y)-f2(x-i, y-j)\}^2$ yields zero.

That is, if a pixel of interest in one (or both) of two pieces of paper fingerprint information has a dark color, the density difference at that pixel is not taken into account. This is to ignore a pixel with dust or a color material.

With this processing, since the number of differences to be totalized by Σ symbol increases or decreases, normalization is done by dividing the numerator by the total number $Σα1(x, y)α2(x-i, y-j)$. Assume that an error value $E(i, j)$ corresponding to $Σα1(x, y)α2(x-i, y-j)=0$ is not included in a set of error values ($E(-(n-1), -(m-1))$ to $E(n-1, m-1)$) to be described later.

<Determination Method of Degree of Matching>

If $E(k, l)=\min\{E(i, j)\}$, as described above, it reveals that the acquisition position of the registered paper fingerprint information and that of the currently acquired paper fingerprint information are shifted from each other by k and l.

Subsequently, a value indicating how much the two pieces of paper fingerprint information are similar to each other (this value will be referred to as a degree of matching hereinafter) is calculated using its $E(k, l)$ and other $E(i, j)$ values.

An average value of 40 is calculated from the set of error values obtained by the function given by equation (1) above (for example, $E(0, 0)=10*$, $E(0, 1)=50$, $E(1, 0)=50$, $E(1, 1)=50$) . . . (A)

Note that * has nothing to do with a value. This mark is attached to draw your attention. The reason why drawing your attention is important will be explained later.

Next, the respective error values (10*, 50, 50, 50) are subtracted from the average value of 40 to calculate a new set (30*, −10, −10, −10) . . . (B)

Then, from this new set, a standard deviation ($30×30+10×10+10×10+10×10=1200$, $1200/4=300$, $\sqrt{300}=10\sqrt{3}≈17$) is calculated. The new set is divided by 17 to calculate quotients (1*, −1, −1, −1) . . . (C)

A maximum value of these quotients is determined as a degree of matching "1*". Note that the value "1*" corresponds to $E(0, 0)=10*$. $E(0, 0)$ is a value that meets $E(0, 0)=\min\{E(i, j)\}$ in this case.

<Conceptual Explanation of Determination Method of Degree of Matching>

The processing for implementing the determination method of the degree of matching consequently calculates the distance between the smallest error value in the set of a plurality of error values, and the average error value (A and B).

Then, the distance is divided by the standard deviation to calculate the degree of matching (C).

Finally, the degree of matching is compared with a threshold to obtain a verification result (D).

Note that the standard deviation means an average value of "differences between respective error values and average value". Put differently, the standard deviation is a value roughly indicating a variation in the set as a whole.

By dividing the distance by the whole variation value, how small $\min\{E(i, j)\}$ is in the set $E(i, j)$ (whether it is small immensely or only a little bit) can be determined.

It is then determined that $\min\{E(i, j)\}$ is valid if it is small very immensely; otherwise, it is determined that $\min\{E(i, j)\}$ is invalid (D).

<Reason why it is Determined that $\min\{E(i, j)\}$ is Valid Only when it is Small in Set $E(i, j)$ Very Immensely>

Assume that the registered paper fingerprint information and the currently acquired paper fingerprint information were acquired from the same paper sheet.

Hence, there can be a location (shift position) where the registered paper fingerprint information extremely matches the currently obtained paper fingerprint information. At this time, since the registered paper fingerprint information and the currently acquired paper fingerprint information extremely match at this shift position, $E(i, j)$ can be very small.

On the other hand, if the two pieces of paper fingerprint information shift from each other even slightly, the registered paper fingerprint information and the currently acquired paper fingerprint information no longer have any relevance. Therefore, $E(i, j)$ will assume a normal large value.

For this reason, the condition "two pieces of paper fingerprint information are acquired from the same paper sheet" matches the condition "the smallest $E(i, j)$ is immensely small in the set $E(i, j)$".

A description will revert to <paper fingerprint information verification processing>.

In step S1203, the CPU 301 compares the degree of matching between the two pieces of paper fingerprint information obtained in step S1202 with a predetermined threshold to determine "valid" or "invalid". Note that the degree of matching will also be referred to as a similarity. Also, the comparison result between the degree of matching and predetermined threshold will also be referred to as a verification result.

<Paper Fingerprint Extraction Processing>

A method of extracting paper fingerprint information from a paper sheet upon execution of the aforementioned paper fingerprint information verification processing will be described below with reference to FIGS. 13 to 16.

FIGS. 13 to 16 are views for explaining a method of extracting paper fingerprint information by scanning the two pieces of paper fingerprint encoded information 1001 and 1002 from the paper sheet 600 shown in FIG. 10 using the scanner unit 113. As described above, the paper sheet 600 includes the two pieces of paper fingerprint encoded information 1001 and 1002 each of which is obtained by encoding the paper fingerprint information and its position. The scanner unit 113 of, e.g., the image forming apparatus 110 scans the two pieces of paper fingerprint encoded information 1001 and 1002 from the paper sheet 600.

Figure 13:
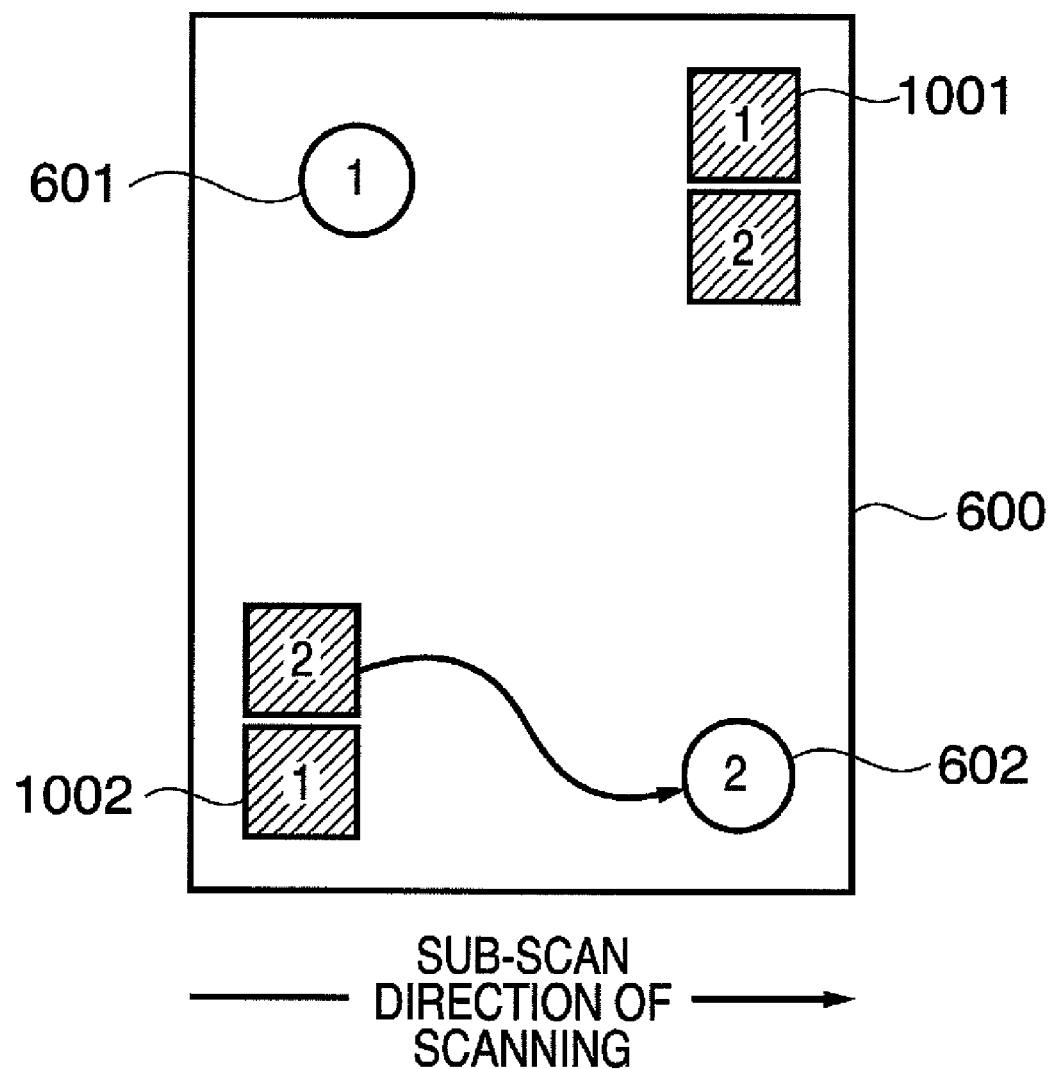
FIG. 13 is a view for explaining a method of extracting paper fingerprint information from a paper sheet.

Upon scanning the paper sheet 600 by the scanner unit 113 in a sub-scan direction of scanning in FIG. 13, the paper fingerprint encoded information 1002 is scanned first. In the paper fingerprint encoded information, the print position information of the paper fingerprint encoded information and the encoded information of the position information of the areas 601 and 602 where the paper fingerprint information was collected and the paper fingerprint information are printed. In this case, the paper fingerprint collection positions in the paper sheet 600 can be specified from two kinds of position information, i.e., the print position information of the paper fingerprint encoded information and the collection position information of the paper fingerprint information.

That is, the print position of the paper fingerprint encoded information and the two collection positions are compared in the sub-scan direction of scanning, and an area which is scanned later in terms of the time or position with respect to the print position of the paper fingerprint encoded information in the scanning in the sub-scan direction is selected as the paper fingerprint collection position. In case of FIG. 13, the area 602 corresponds to an area scanned later. Since the position of the area 602 can be specified, paper fingerprint encoded information 1002 is extracted from that area 602 as paper fingerprint information.

FIG. 14 shows a case wherein the paper sheet 600 shown in FIG. 13 is turned upside down. In this case, the paper fingerprint encoded information 1001 is scanned first, the area 601 is selected based on the print position information of the paper fingerprint encoded information and the collection position information of the paper fingerprint information in the scanned information, and paper fingerprint information is extracted from that area 601.

Figure 15:
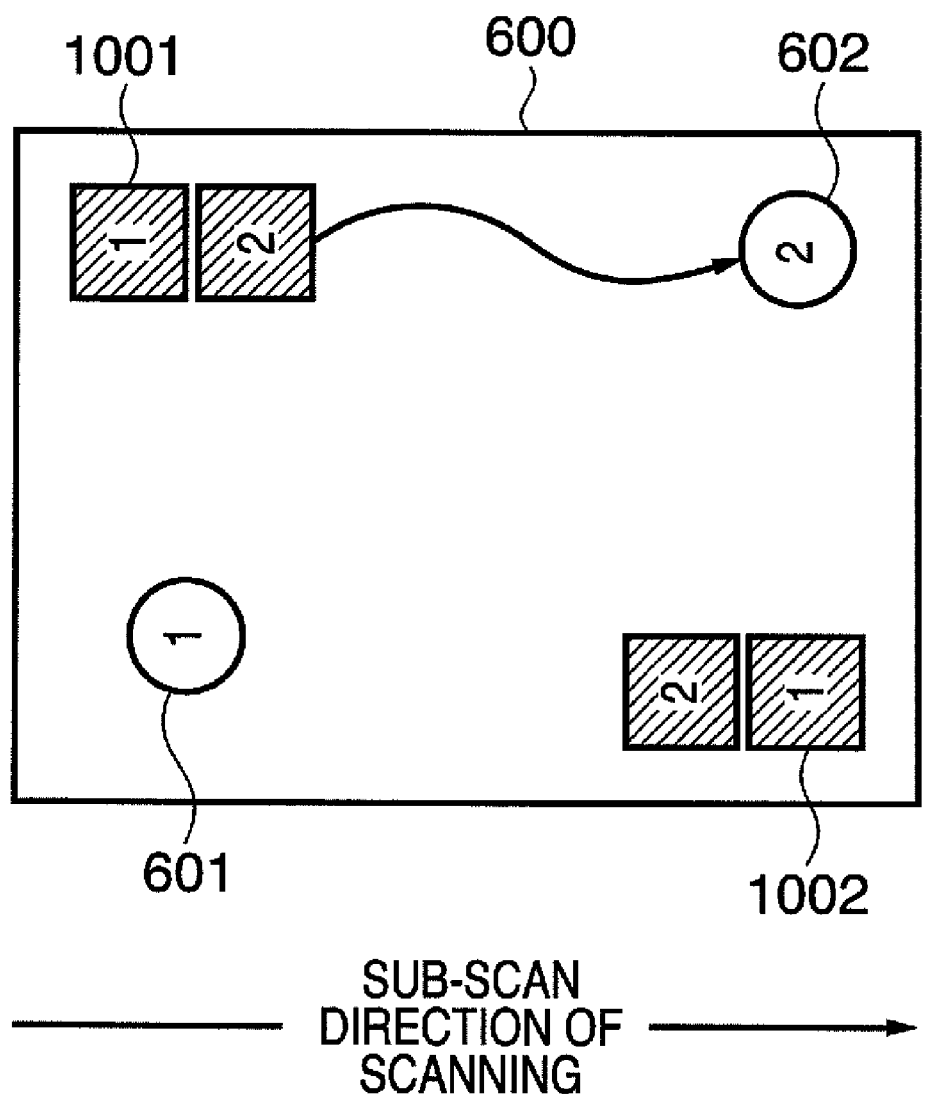
FIG. 15 is a view for explaining a method of extracting paper fingerprint information from a paper sheet.

FIG. 15 shows the extraction method when the paper sheet 600 has a landscape orientation. In the example shown in FIG. 15, the paper fingerprint encoded information 1001 is scanned first, the area 602 is selected as the collection position based on the print position information of the paper fingerprint encoded information and the collection position information of the paper fingerprint information in the scanned information, and paper fingerprint information is extracted from that area 602.

Figure 16:
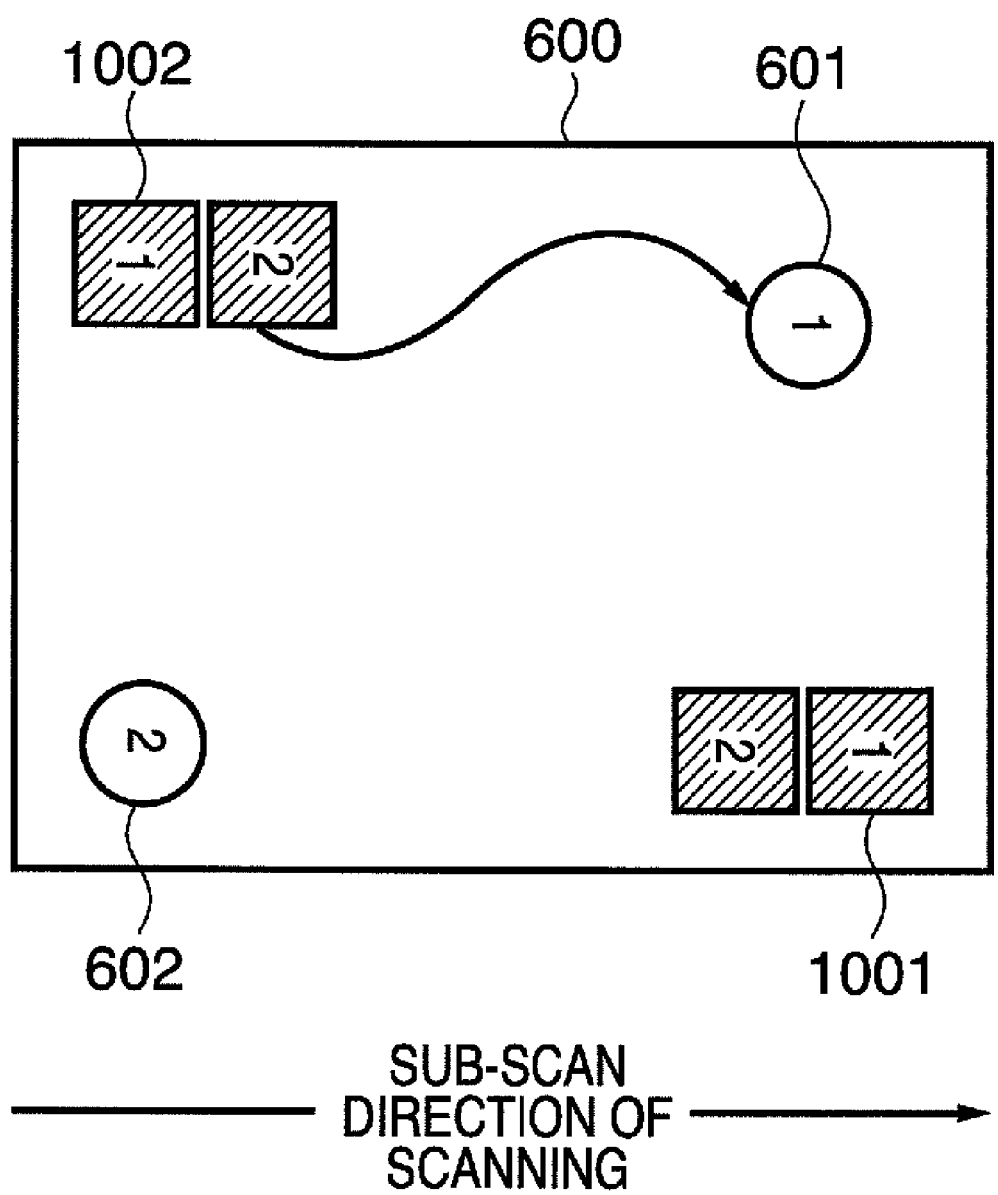
FIG. 16 is a view for explaining a method of extracting paper fingerprint information by scanning two pieces of paper fingerprint encoded information 1001 and 1002 from the paper sheet 600 shown in FIG. 10 using a scanner unit 113.
Figure 17:
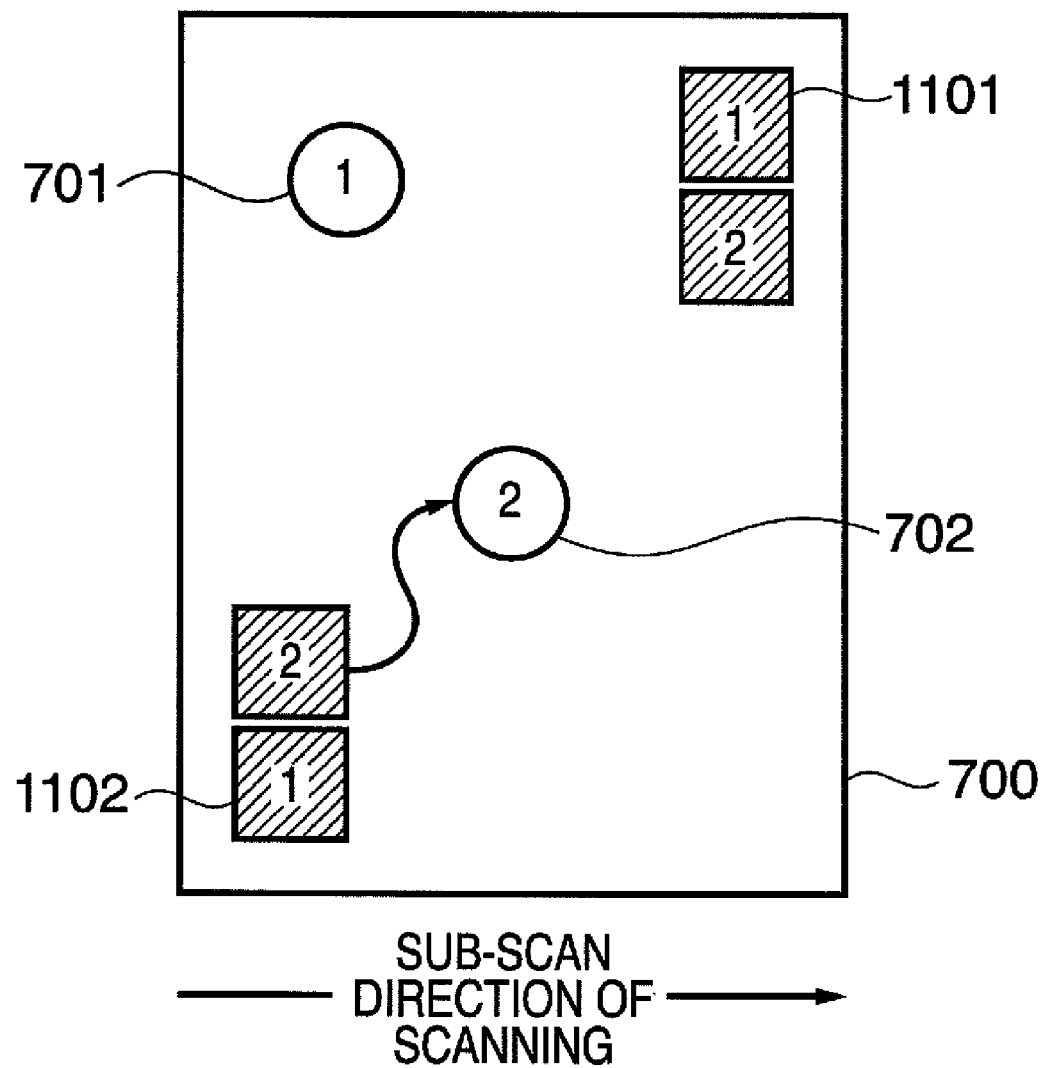
FIG. 17 is a view for explaining a method of extracting paper fingerprint information from a paper sheet.

FIG. 16 shows a case wherein the paper sheet 600 shown in FIG. 15 is turned upside down. In this case, the paper fingerprint encoded information 1002 is scanned first, the area 601 is selected as the collection position based on the print position information of the paper fingerprint encoded information and the collection position information of the paper fingerprint information in the scanned information, and paper fingerprint information is extracted from that area 601.

Note that the extraction method of the paper fingerprint information can be similarly applied as in FIGS. 13 to 16 even in case of FIG. 11 in which the paper fingerprint extraction positions are different from FIG. 10.

Figure 18:
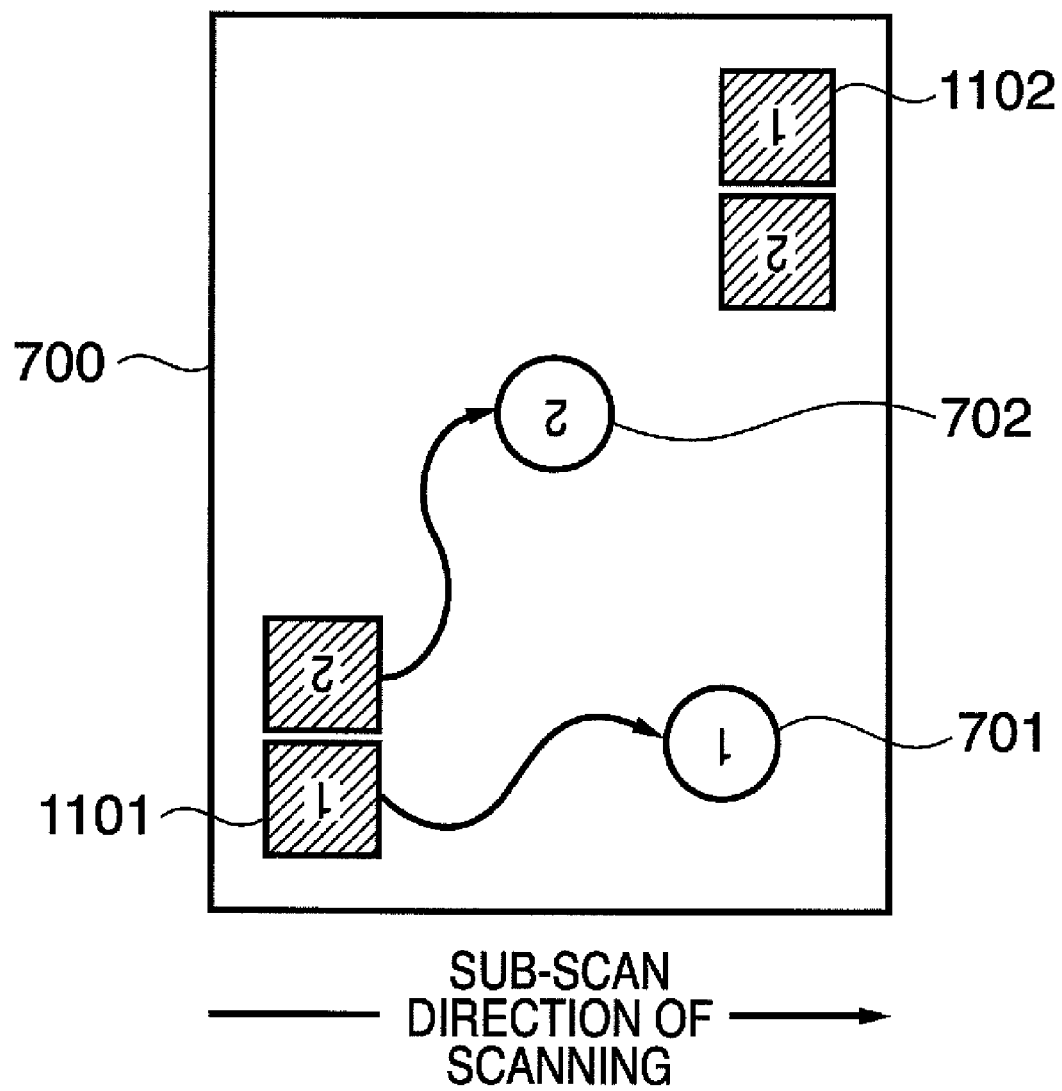
FIG. 18 is a view for explaining a method of extracting paper fingerprint information from a paper sheet.
Figure 19:
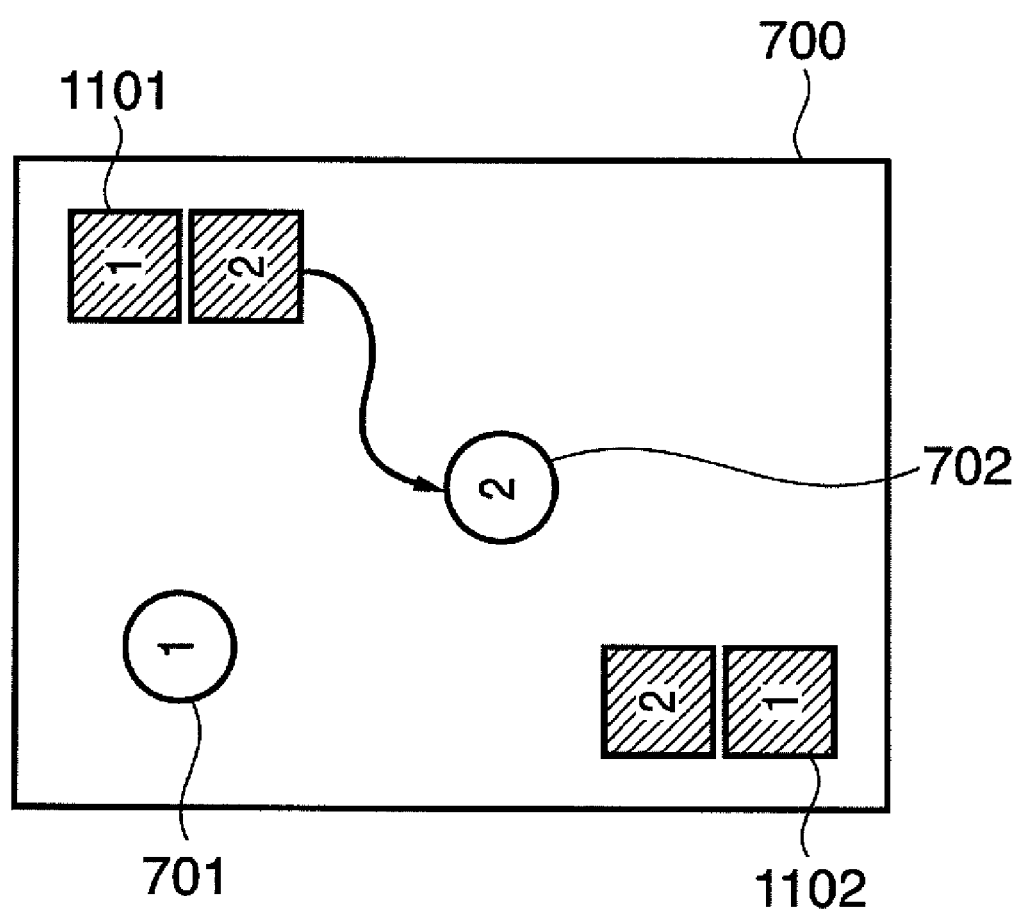
FIG. 19 is a view for explaining a method of extracting paper fingerprint information from a paper sheet.
Figure 20:
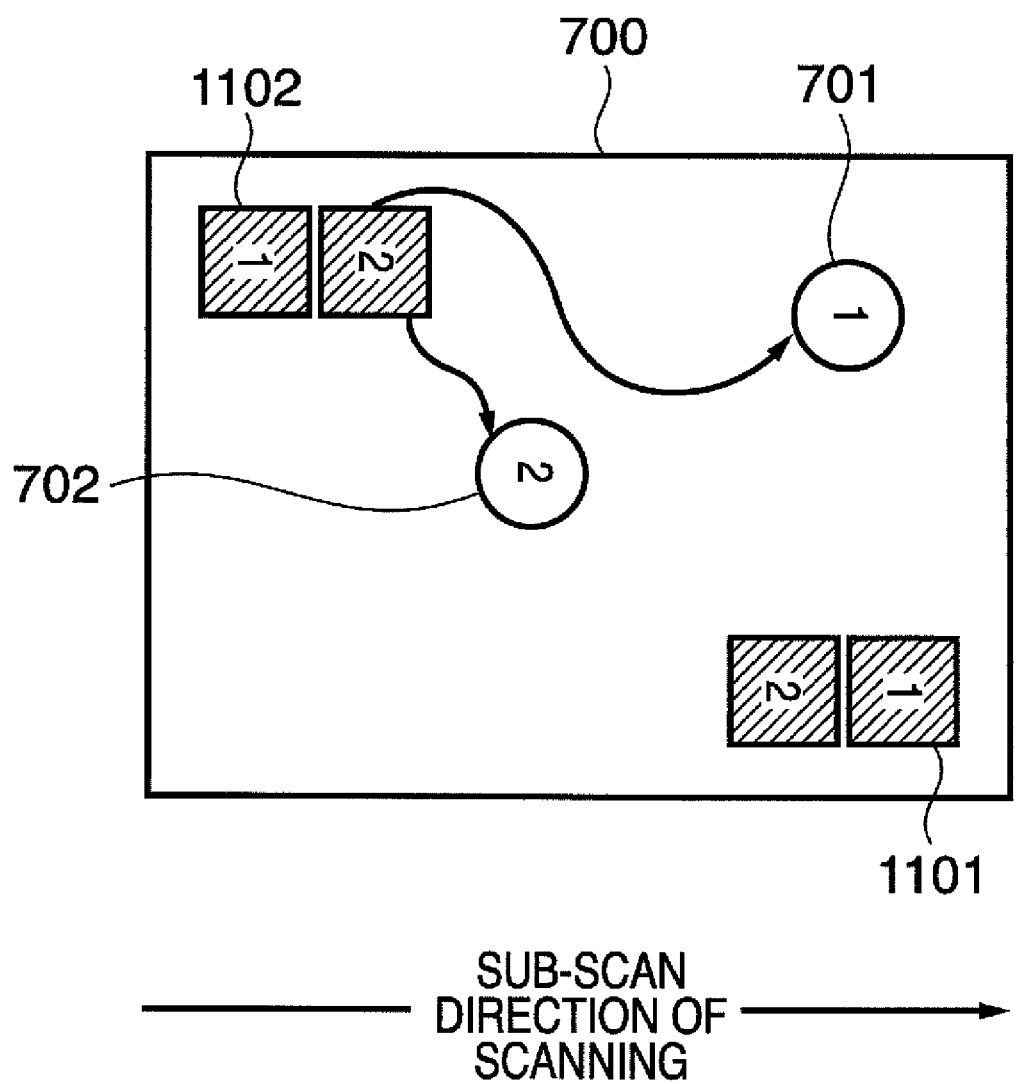
FIG. 20 is a view for explaining a method of extracting paper fingerprint information by scanning two pieces of paper fingerprint encoded information 1101 and 1102 from the paper sheet 700 shown in FIG. 11 using the scanner unit 113.

FIGS. 17 to 20 are views for explaining the method of extracting paper fingerprint information by scanning the two pieces of paper fingerprint encoded information 1101 and 1102 from the paper sheet 700 shown in FIG. 11 using the scanner unit 113. As shown in FIGS. 17 to 20, even upon scanning the paper sheet in any of the illustrated directions, the position of the paper fingerprint information can be specified and the paper fingerprint information can be extracted. As shown in FIGS. 18 and 20, the paper fingerprint information can be extracted from two locations depending on the positions.

As described above, the position information of the paper fingerprint encoded information and the acquisition position information of the paper fingerprint information are appended to the paper fingerprint encoded information, which is allocated at two corners as the cater-cornered positions of a paper sheet. Hence, the position of the paper fingerprint information can be accurately specified, and the required paper fingerprint can be adequately extracted. By extracting the paper fingerprint information from at least two locations, the position of the paper fingerprint information can be specified even when the paper sheet is scanned from any of top, bottom, right, and left directions.

Note that the paper fingerprint encoded information can be easily recognized since it is information like a two-dimensional barcode. The position information need not always be embedded in the paper fingerprint encoded information. The position information may be independently provided. In this case, the position information may be either visible or invisible.

<Explanation of Operation Window>

The processing that makes the user register and verify paper fingerprint information from a window displayed on the operation unit 112 of the image forming apparatus 110 will be described below with reference to FIGS. 21 to 23.

Figure 21:
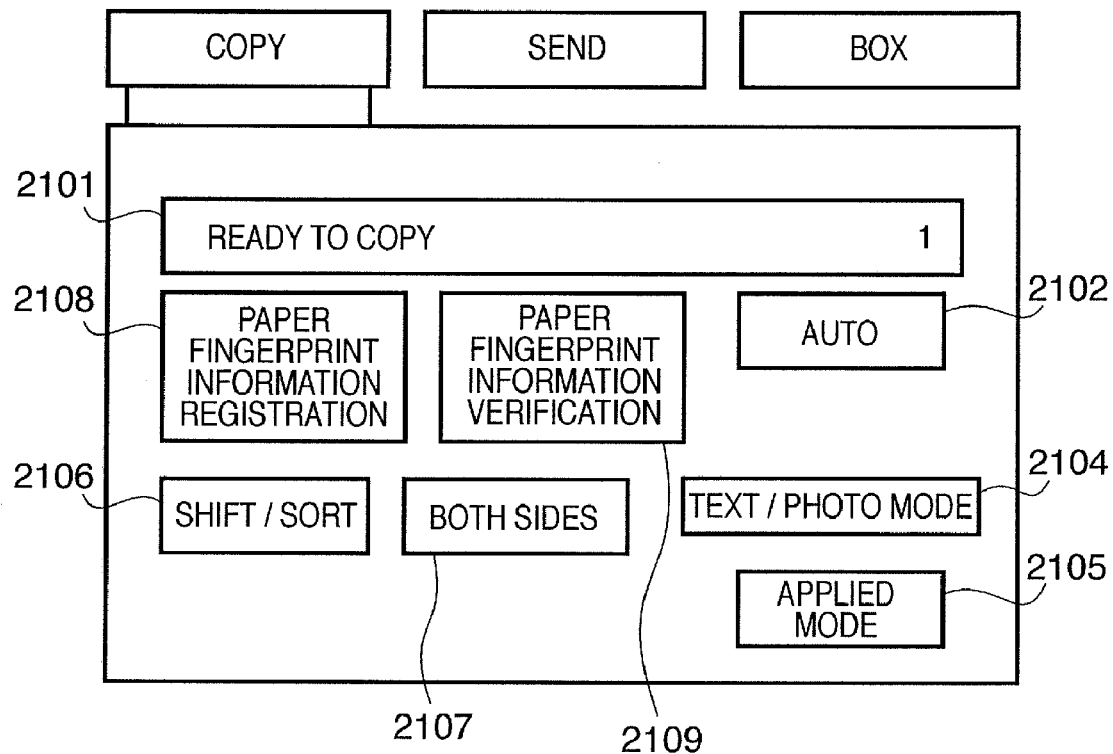
FIG. 21 shows an example of an initial window of the image forming apparatus 110.

FIG. 21 shows an example of an initial window of the image forming apparatus 110. A field 2101 indicates whether or not the image forming apparatus 110 is ready to copy, and also a set copy count. A tab 2104 allows the user to select a document type. Upon pressing this tab 2104, a selection menu that allows the user to select one of three different modes, i.e., a text mode, photo mode, and text/photo mode pops up.

A shift/sort tab 2106 allows the user to make settings about various finishing functions. A both-sided setting tab 2107 allows the user to make settings about scanning and printing of both sides. A scan mode tab 2102 allows the user to select a document scan mode. Upon pressing tab, a selection menu that allows the user to select one of three different modes, i.e., a color mode, black mode, and auto (ACS) mode pops up. Upon selection of the color mode, a color copy is formed; upon selection of the black mode, a monochrome copy is formed. Upon selection of the ACS mode, a copy mode is determined based on the aforementioned monochrome/color determination signal.

A tab 2108 allows the user to select the registration processing of paper fingerprint information. Details of this registration processing will be described later. A tab 2109 allows the user to select the verification processing of paper fingerprint information. Details of this verification processing will be described later.

<Paper Fingerprint Information Registration Processing>

The paper fingerprint information registration processing executed when the user presses the tab 2108 and then a start key will be described below with reference to FIG. 22.

Figure 22:
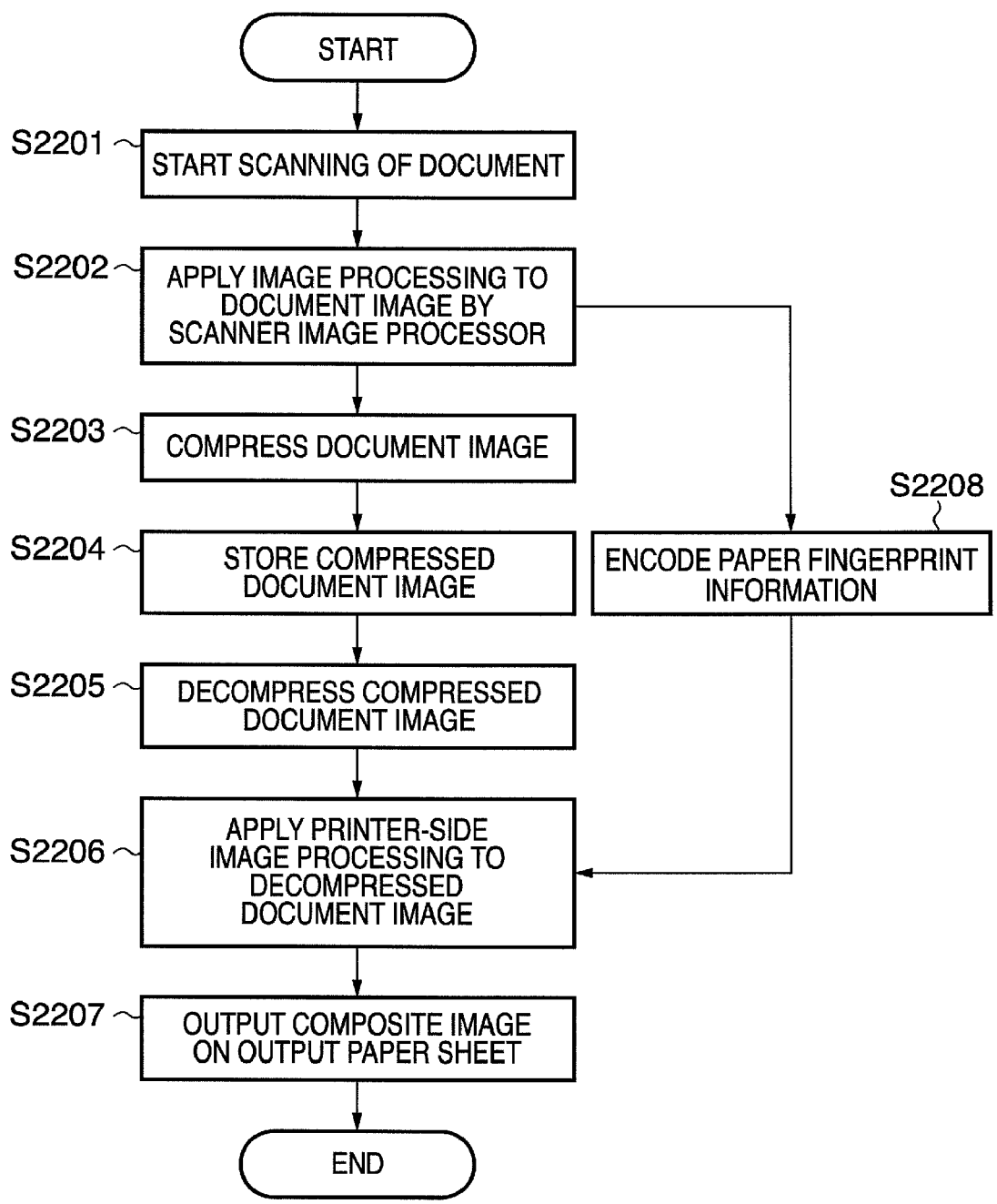
FIG. 22 is a flowchart showing the paper fingerprint information registration processing according to the first embodiment.

FIG. 22 is a flowchart showing the paper fingerprint information registration processing according to the first embodiment. In step S2201, the CPU 301 sends a document image scanned by the scanner unit 113 as image data to the scanner image processor 312 via the scanner I/F 311. In step S2202, the scanner image processor 312 sets a general gain control value in the shading correction unit 500, and then applies the processing shown in FIG. 5 to this image data, thereby generating new image data and attribute data. The scanner image processor 312 appends this attribute data to the image data.

Furthermore, the scanner image processor 312 sets a gain control value smaller than the aforementioned gain control value in the shading correction unit 500. The shading correction unit 500 outputs respective luminance signal values obtained by applying the smaller gain control value to the image data to the paper fingerprint information acquisition unit 507. After that, the paper fingerprint information acquisition unit 507 acquires paper fingerprint information based on the output data. The paper fingerprint information acquisition unit 507 stores the acquired paper fingerprint information in the RAM 302 using the data bus (not shown). To attain this processing, the shading correction unit 500 holds two shading correction circuits. Also, in the masking processor 501, two masking processing circuits are prepared: the output from the first masking processing circuit is output to the filter processor 502, and that of the second masking processing circuit is output to the paper fingerprint information acquisition unit 507. Note that the same processing can be implemented using a pair of shading correction circuit and masking processing circuit by holding an image using an image memory and time-sharing the shading correction circuit and masking processing circuit.

Upon completion of the processing in step S2202, the CPU 301 simultaneously starts the processes in steps S2203 and S2208. At this time, as for the acquisition area of paper fingerprint information, the document image may be previewed or an image of the document may be rendered on the operation window to prompt the user to designate the position or to randomly determine the position. Alternatively, a background part may be automatically determined based on a background signal level, or a position inside an appropriate image area may be automatically selected by checking an edge amount and the like.

In step S2208, the CPU 301 encodes the paper fingerprint information to generate encoded image data, and sends the generated encoded image data to the encoded image composition unit 907 in the printer image processor 315.

On the other hand, in step S2203 the compression unit 313 segments the new image data generated by the scanner image processor 312 into blocks each including 32×32 pixels to generate tile data. Furthermore, the compression unit 313 compresses this image data including a plurality of tile data.

In step S2204, the CPU 301 stores the image data compressed by the compression unit 313 in the RAM 302. Note that this image data is sent to the image conversion unit 317 as needed, and is sent to and stored in the RAM 302 after it undergoes the image processing.

In step S2205, the CPU 301 sends the image data stored in the RAM 302 to the decompression unit 316. Furthermore, the decompression unit 316 decompresses this image data. The decompression unit 316 rasterizes the decompressed image data including a plurality of tile data. The rasterized image data is sent to the printer image processor 315.

In step S2206, the printer image processor 315 edits the image data according to the attribute data appended to that image data. This processing is that which has already been described using FIG. 9. In this processing, the encoded image data generated in step S2208 and (document) image data are composited.

More specifically, the encoded image composition unit 907 composites the (document) image data output from the output-side gamma correction unit 905 and the encoded image data generated in step S2208. The halftone correction unit 906 applies halftone processing to the composite image data in correspondence with the number of tones of the printer unit 114 which outputs an image. The composite image data that has undergone the halftone processing is sent to the printer unit 114 via the printer I/F 314.

In step S2207, the printer unit 114 forms an image of the composite image data on an output paper sheet.

<Paper Fingerprint Information Verification Processing>

The paper fingerprint information verification processing executed when the user presses the tab 2109 shown in FIG. 21 and then the start key will be described below with reference to FIG. 23.

Figure 23:
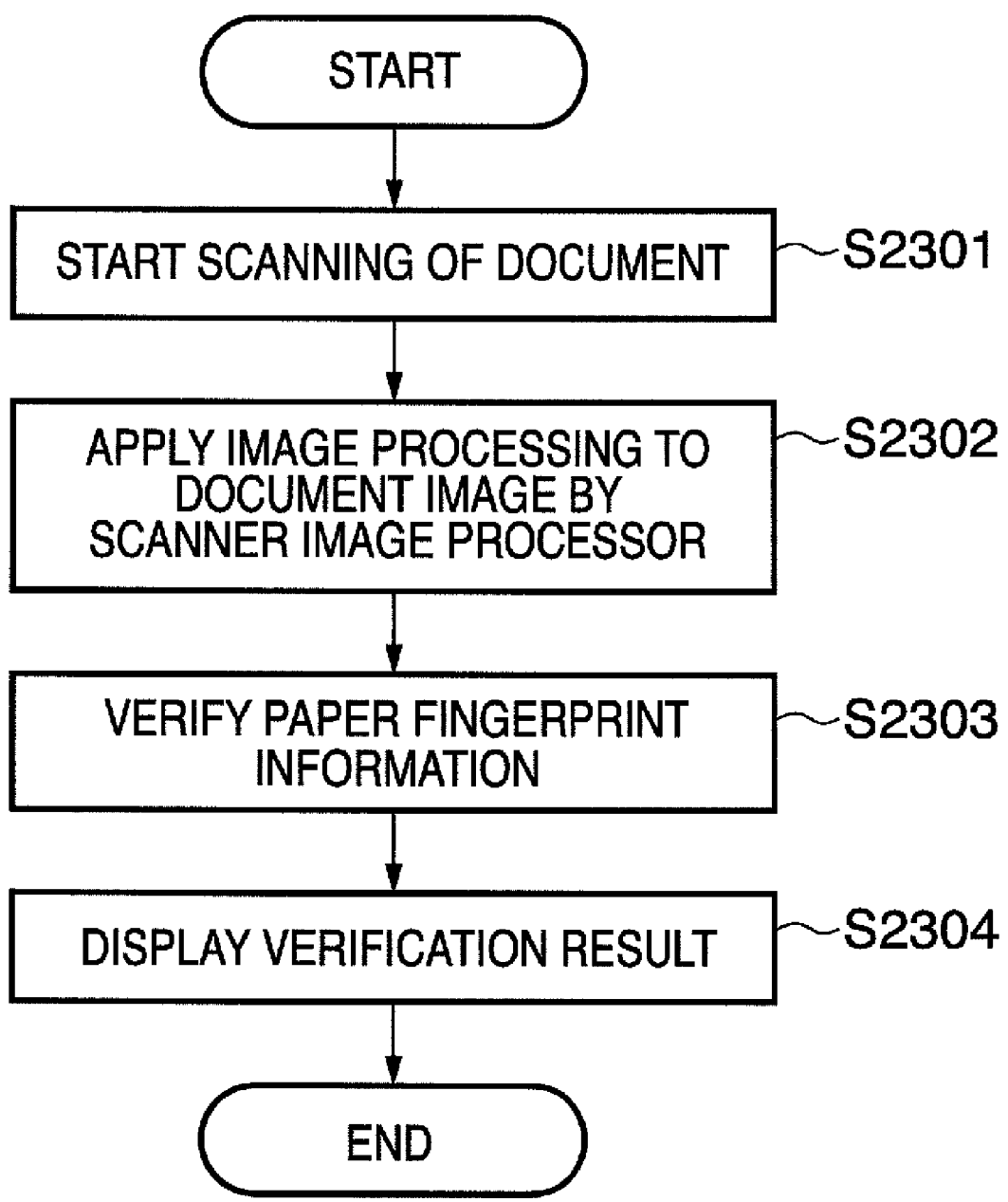
FIG. 23 is a flowchart showing the paper fingerprint information verification processing according to the first embodiment.

FIG. 23 is a flowchart sowing the paper fingerprint information verification processing according to the first embodiment. In step S2301, the CPU 301 sends a document image scanned by the scanner unit 113 as image data to the scanner image processor 312 via the scanner I/F 311. In step S2302, the scanner image processor 312 applies the processing shown in FIG. 5 to this image data to generate new image data and attribute data. The scanner image processor 312 appends this attribute data to the image data.

Furthermore, in this step S2302 the paper fingerprint information acquisition unit 507 in the scanner image processor 312 acquires paper fingerprint information. Note that the arrangement that performs the gain control of the shading correction unit 500 and so forth to acquire paper fingerprint information is as described above. The position determination upon acquiring paper fingerprint information is as has been described in <paper fingerprint extraction processing>. The paper fingerprint information acquisition unit 507 stores the acquired paper fingerprint information in the RAM 302 using the data bus (not shown).

In addition, in step S2302 the decoding unit 508 in the scanner image processor 312 decodes an encoded image to acquire information if the encoded image is included. The decoding unit 508 stores the acquired information in the RAM 302 using the data bus (not shown).

In step S2303, the CPU 301 executes the paper fingerprint information verification processing. This paper fingerprint information verification processing is as has been described in <paper fingerprint information verification processing> using FIG. 12.

In step S2304, the CPU 301 displays the result (valid or invalid) obtained by <paper fingerprint information verification processing> on the display screen of the operation unit 112.

As described above, since the position information of the paper fingerprint encoded information and the collection position information of paper fingerprints are appended to the paper fingerprint encoded information, and is allocated at two corners as the cater-cornered positions on a paper sheet, the paper fingerprint position can be accurately specified, and a required paper fingerprint can be adequately extracted.

Since the paper fingerprints are collected from at least two locations, the paper fingerprint position can be specified even when the paper sheet is scanned from any of top, bottom, right, and left directions.

Note that the position information need not always be embedded in the paper fingerprint encoded information. The position information may be independently provided. In this case, the position information may be either visible or invisible.

Second Embodiment

The second embodiment according to the present invention will be described in detail hereinafter with reference to the accompanying drawings. In the first embodiment, since the position information of the paper fingerprint encoded information and the collection position information of paper fingerprints are appended to the paper fingerprint encoded information, and is allocated at two corners as the cater-cornered positions on a paper sheet, the paper fingerprint position can be accurately specified. However, when a paper sheet is intentionally obliquely set on the scanner, paper fingerprint scan often fails.

Hence, as the second method, a method that can specify the paper fingerprint position even when a paper sheet is obliquely set will be described below with reference to FIGS. 24 to 27.

Figure 24:
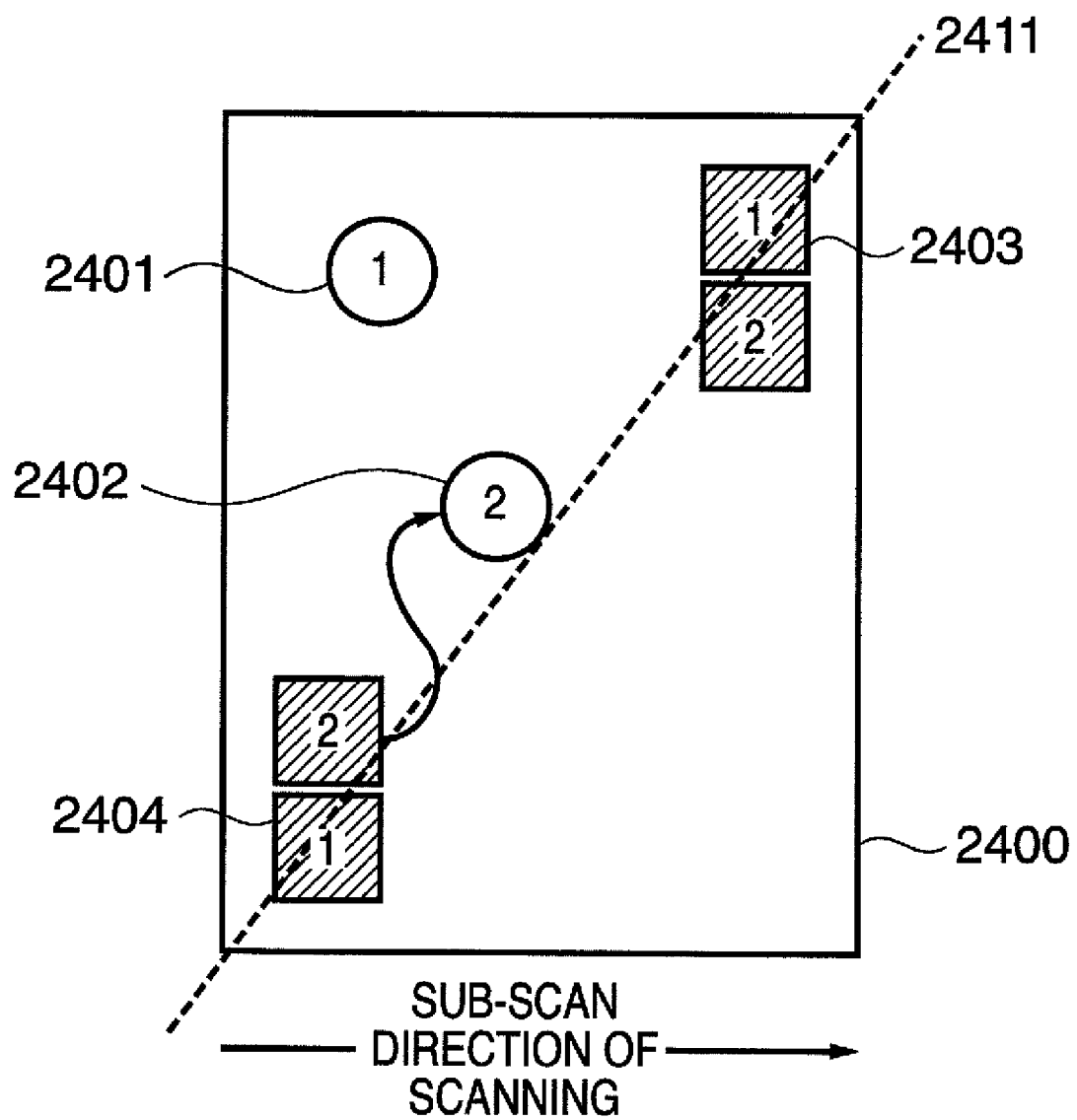
FIG. 24 shows an example of an extraction failure of a paper fingerprint because of the way a paper sheet is placed.

FIG. 24 shows an example of an extraction failure of a paper fingerprint because of the way a paper sheet is placed. On a paper sheet 2400 shown in FIG. 24, the position of an area 2402 is different from the first embodiment. That is, an area 2401 and the area 2402 are located on the same side with respect to a diagonal line 2411 that connects two pieces of paper fingerprint encoded information at two corners as the cater-cornered positions. On this paper sheet 2400, these areas are located on the side above the diagonal line 2411.

Figure 25:
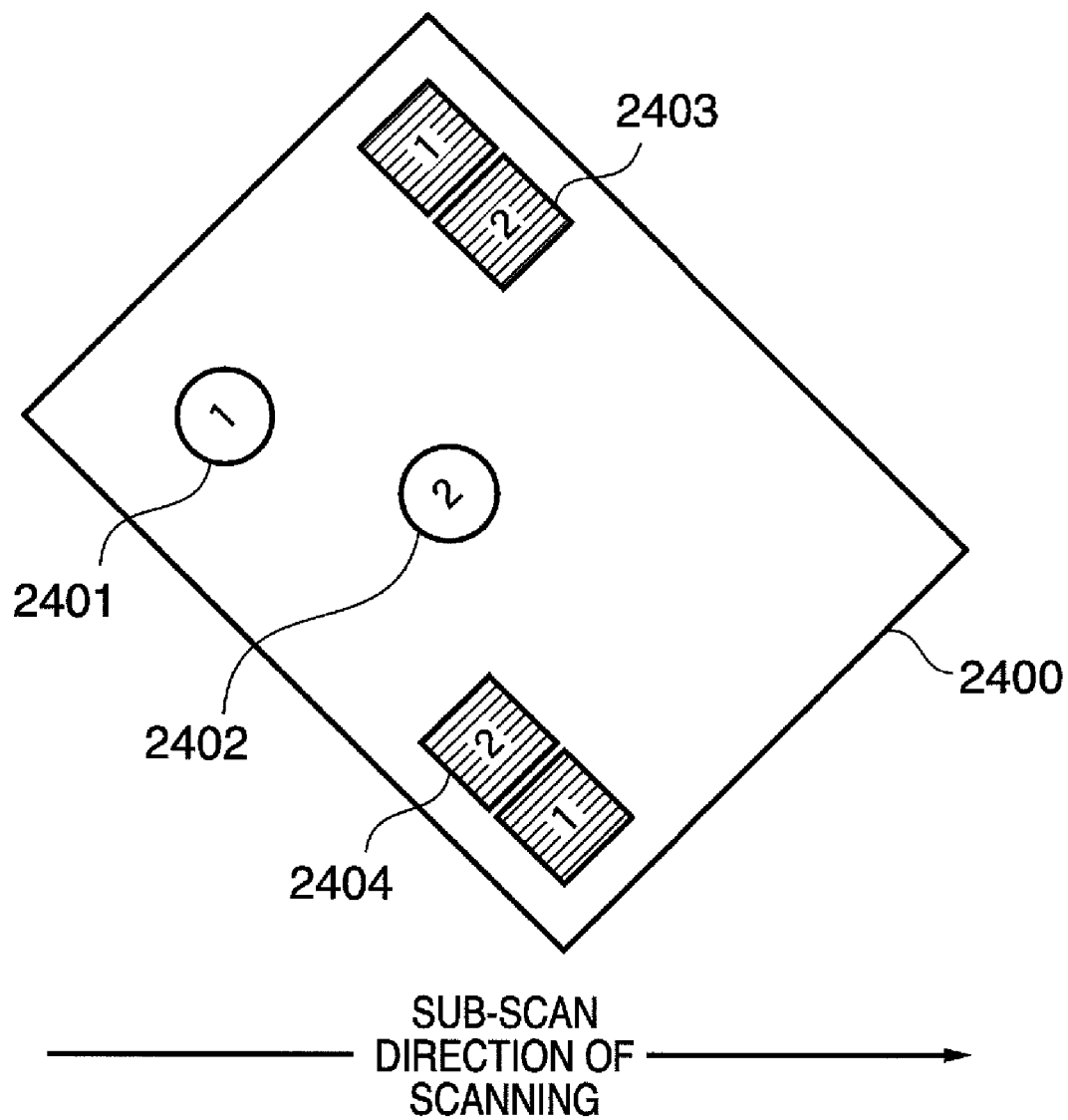
FIG. 25 shows an example of an extraction failure of a paper fingerprint because of the way a paper sheet is placed.

According to the extraction method described in the first embodiment, even when the paper sheet 2400 is turned upside down or leftside right, the paper fingerprint position can be specified. However, when the paper sheet is obliquely scanned by the scanner 113, as shown in FIG. 25, specification of the paper fingerprint position may fail. Since the paper fingerprint encoded information is printed behind the position where the paper fingerprint is actually scanned in the sub-scan direction, the paper fingerprint position cannot be specified. A method of solving this problem will be described below with reference to FIGS. 26 and 27.

Figure 26:
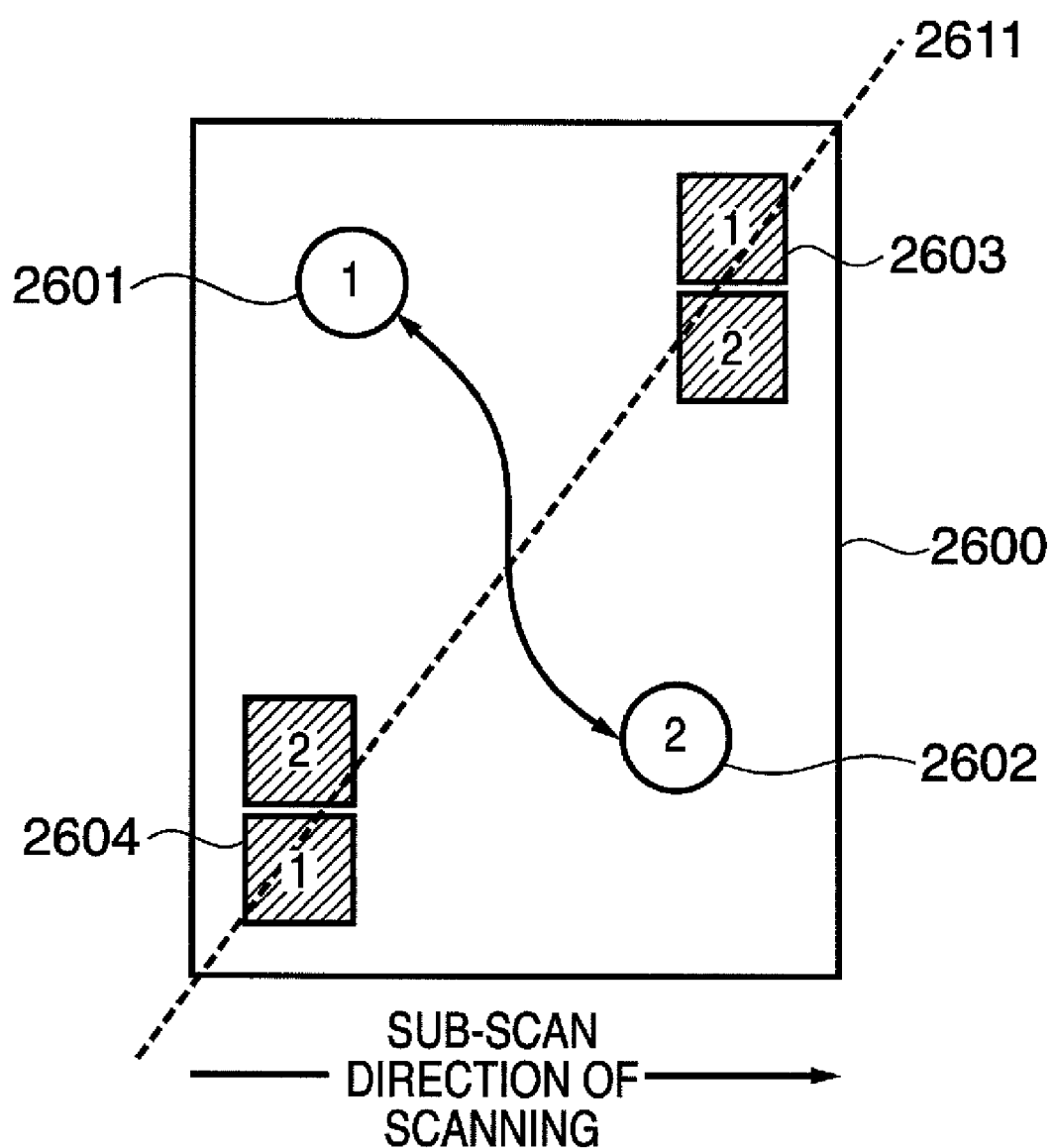
FIG. 26 shows a case example for solving the example of the extraction failure of a paper fingerprint because of the way a paper sheet is placed.
Figure 27:
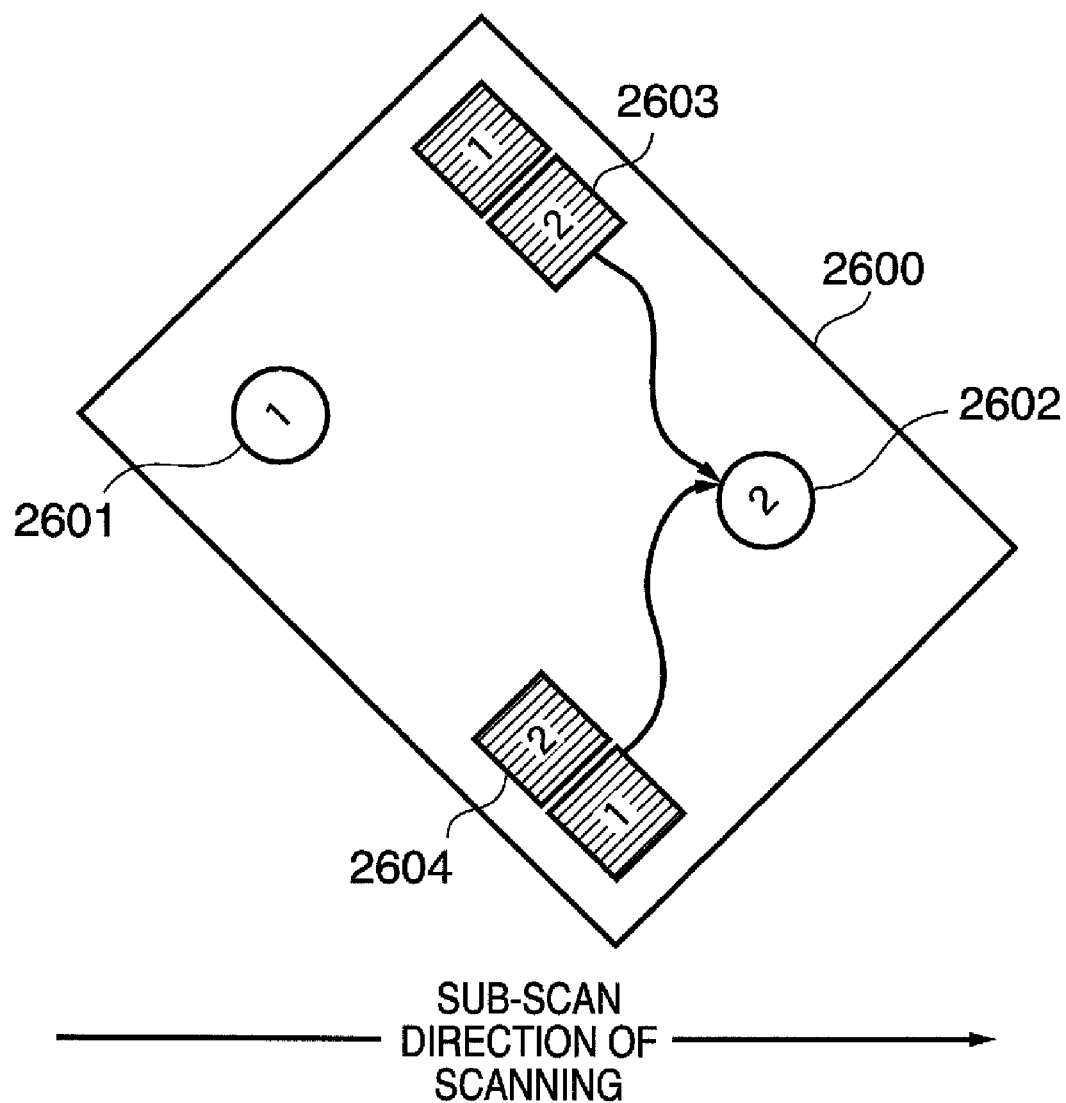
FIG. 27 is a view for explaining a paper fingerprint extraction method according to the second embodiment.

FIGS. 26 and 27 are views for explaining the extraction method of paper fingerprint information according to the second embodiment. On a paper sheet 2600 shown in FIG. 26, paper fingerprint information is extracted on both the sides (on the right and left sides) of a diagonal line 2611 that connects two out of four corners upon extracting the paper fingerprint information. More specifically, paper fingerprint information is extracted at the positions of areas 2601 and 2602. In order to make the user designate these paper fingerprint extraction positions, a user interface which follows the above rules can be provided. That is, a user interface which makes the user designate the first paper fingerprint extraction position, and then limits the second paper fingerprint extraction position is provided.

A blank portion where no data to be printed exists or a low-density portion close to the blank portion of a paper sheet is preferably selected for a paper fingerprint extraction position since that paper sheet portions are not covered by print materials such as toner, ink, and the like and fiber information of the paper sheet can be easily scanned.

Therefore, upon adopting the arrangement in which the CPU 301 of the image forming apparatus determines the paper fingerprint extraction positions, the paper fingerprint extraction positions are determined as follows even when image data is printed on a paper sheet. That is, paper fingerprint extraction positions are determined on portions which do not undergo any image formation or low-density portions which do not undergo any image formation, and are located on both the sides of the diagonal line 2611 that connects two out of four corners.

In this way, even when a paper sheet is obliquely scanned by the scanner unit 113, as shown in FIG. 27, either one paper fingerprint information can be extracted.

As described above, the position information of the paper fingerprint encoded information and that of the paper fingerprint information are appended to the paper fingerprint encoded information. Then, the paper fingerprint encoded information is allocated at two corners as the cater-cornered positions, and paper fingerprint information is extracted on both the sides of that diagonal line. In this way, the paper fingerprint position can be accurately specified, and required paper fingerprint information can be adequately extracted.

Third Embodiment

The third embodiment according to the present invention will be described in detail hereinafter with reference to the accompanying drawings. In the first embodiment, the paper fingerprint information and paper fingerprint encoded information are decoded, and when two pieces of paper fingerprint information do not match, if one of the scanned paper fingerprint information or decoded paper fingerprint information is rotated through 90°, 180°, or 270°, they match. However, if the angle to be rotated is detected in advance, the verification processing need be done only once.

In the second embodiment, since the tilt of a paper sheet is not in increments of 90° but is indefinite, the tilt must be detected and corrected to enhance the verification precision in the verification processing.

Hence, the third embodiment will explain a method of detecting the direction and tilt of a paper sheet, and correcting them. First, the top, bottom, right, and left of a paper sheet are detected to determine a tilt in increments of 90°. After that, a tilt less than 90° is detected for the purpose of correction.

Figure 28A:
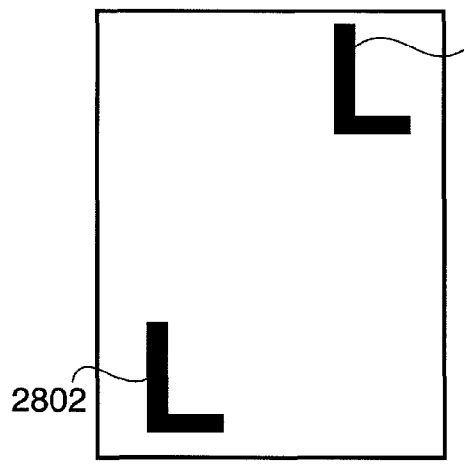
FIGS. 28A to 28D are views showing an example of a detection method of detecting paper directions (top, bottom, right, and left in increments of 90°)

FIGS. 28A to 28D show an example of a detection method of detecting the direction (top, bottom, right, and left in increments of 90°) of a paper sheet. FIG. 28A shows the basic direction of a paper sheet. For example, L-shaped marks are printed at the same positions of paper fingerprint encoded information simultaneously with the paper fingerprint encoded information. L-shaped marks 2801 and 2802 are printed at least at two corners as the cater-cornered positions. At this time, the L-shaped marks 2801 and 2802 have the same direction.

Figure 28B:
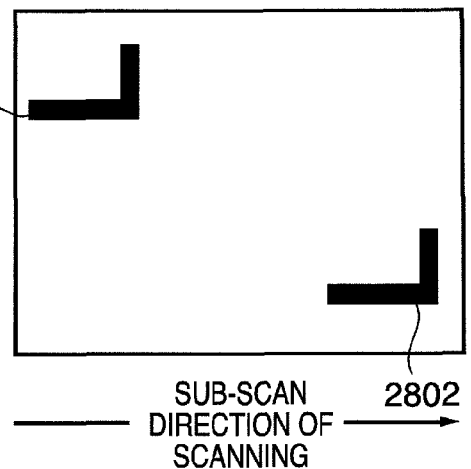
Figure 28C:
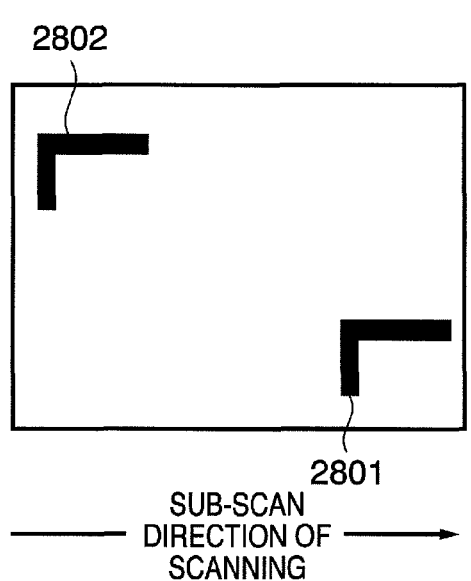
Figure 28D:
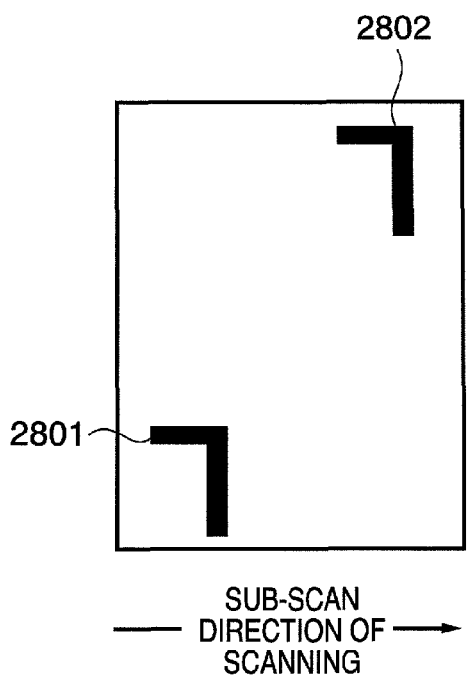

FIG. 28B shows a case wherein the paper sheet shown in FIG. 28A is scanned while being rotated counterclockwise through 90°. In this case, the direction can be detected using the L-shaped marks 2801 and 2802. FIG. 28C shows a case wherein the paper sheet shown in FIG. 28A is scanned while being rotated clockwise through 90°. FIG. 28D shows a case wherein the paper sheet shown in FIG. 28A is scanned while being turned upside down. In any of these cases, the direction can be specified by detecting the L-shaped marks 2801 and 2802.

In this embodiment, the L-shaped marks have been exemplified. However, the present invention is not limited to such specific marks. Any other marks can be used as long as they can be easily detected, and allow easy determination of the direction. Alternatively, information indicating the direction may be embedded in the encoded information in place of marks. In the above description, the marks are printed at two corners as the cater-cornered positions. However, even when a mark is printed at one position, it can be specified. However, when marks are printed at a plurality of positions, the direction specifying precision can be enhanced. By detecting the direction at the scanning leading end in the scan direction, real-time processing is allowed.

Figure 29A:
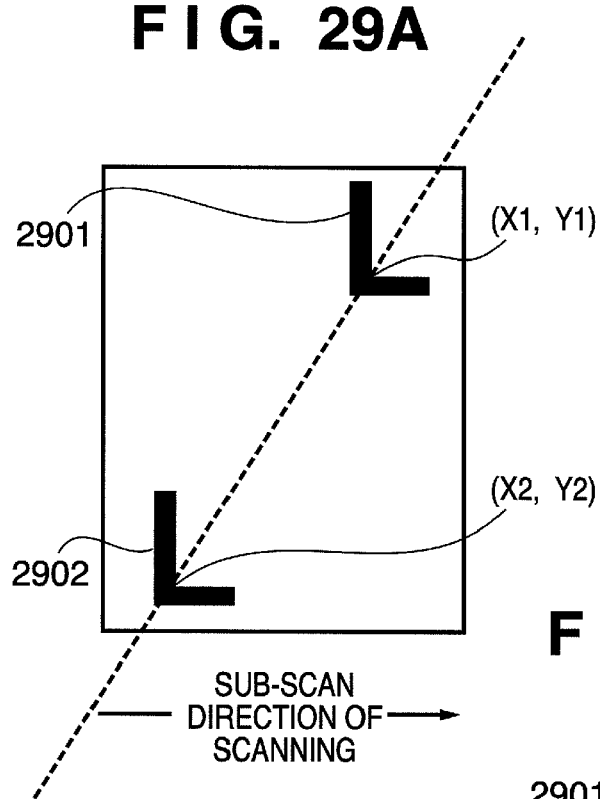
FIGS. 29A and 29B are views showing an example of a detection method of detecting paper tilts.
Figure 29B:
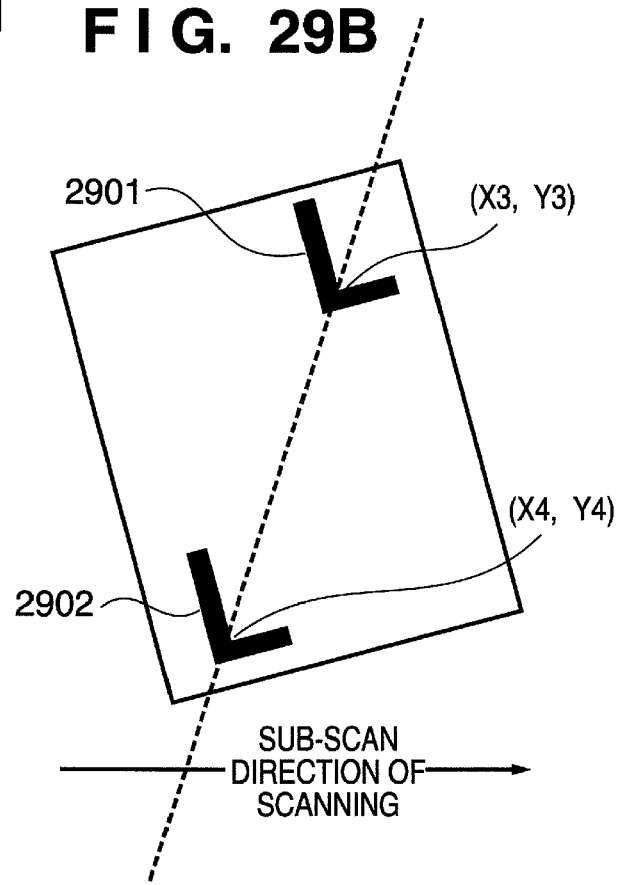

Next, by detecting the tilt together with detection of the direction in increments of 90°, the verification precision can be enhanced, as shown in FIGS. 29A and 29B.

FIGS. 29A and 29B are views showing an example of a detection method of detecting the tilt of a paper sheet. FIG. 29A is a basic view. For example, L-shaped marks 2901 and 2902 are printed at the same positions of paper fingerprint encoded information simultaneously with the paper fingerprint encoded information. At this time, the coordinate position of a specific part of each mark, e.g., the intersection of long and short line segments that form the L-shaped mark, is printed together with the encoded information. At this time, an imaginary coordinate system is set on a paper sheet to determine the coordinate position.

In FIG. 29A, the coordinate position of the L-shaped mark 2901 is (X1, Y1) and that of the L-shaped mark 2902 is (X2, Y2). The tilt is detected from these coordinate positions. A tilt G upon embedding the encoded information is calculated by $G=(Y1-Y2)/(X1-X2)$.

Next, the coordinate positions are determined from an actually scanned image. FIG. 29B shows a case wherein a paper sheet is obliquely scanned. In this case, if the actual coordinate position of the L-shaped mark 2901 is (X3, X3) and that of the L-shaped mark 2902 is (X4, X4), a tilt G on the scanned data is given by $G=(Y3-Y4)/(X3-X4)$.

The tilt upon embedding the encoded information is compared with that of image data upon verification scanning, and the tilt is corrected to fall within a tolerance required for verification. This correction can be implemented by applying known rotation processing such as affine transformation to the scanned data. This method can assure a high degree of freedom upon verification since it has no dependence on the resolution upon printing the encoded information and that upon verification.

As described above, the encoded information and direction detection marks are printed, and the direction of a paper sheet is detected at the time of verification scanning. Furthermore, the encoded information and the coordinate positions of the direction detection marks upon encoding are embedded, and these coordinate positions are compared with those of the direction detection marks in a scanned image upon verification, thus detecting the tilt. The verification processing is executed after tilt correction is executed by the rotation processing based on this tilt as needed, thus maintaining high verification precision.

As described above, according to this embodiment, even when a paper sheet is scanned from any direction upon scanning for verification, the encoded information is acquired first, and the paper fingerprint position can be specified from that encoded information. As a result, paper fingerprint information can be extracted at an arbitrary position.

Since the paper fingerprint position is printed as encoded information on a paper sheet, the paper fingerprint collection position can be prevented from being detected by a third party. Hence, falsification and the like can be prevented, and high security level can be realized.

Note that the present invention may be applied to either a system constituted by a plurality of devices (e.g., a host computer, interface device, reader, printer, and the like), or an apparatus consisting of a single device (e.g., a copying machine, facsimile apparatus, or the like).

A recording medium, which records a program code of software that can implement the functions of the aforementioned embodiments, is supplied to the system or apparatus, and a computer (or a CPU or MPU) of the system or apparatus reads out and executes the program code stored in the recording medium. In this way, the objects of the present invention can be achieved.

In this case, the program code itself read out from the recording medium implements the functions of the aforementioned embodiments, and the recording medium which stores the program code constitutes the present invention.

As the recording medium used to supply the program code, for example, a flexible disk, hard disk, optical disk, magneto-optical disk, CD-ROM, CD-R, magnetic tape, nonvolatile memory card, ROM, and the like can be used.

The functions of the aforementioned embodiments can be implemented not only when the computer executes the read-out program code but also by the following case. That is, this is the case wherein an OS (operating system) or the like which runs on the computer executes some or all of actual processing operations based on instructions of the program code to implement the functions of the aforementioned embodiments.

Furthermore, the present invention also includes the following case. That is, the program code read out from the recording medium is written in a memory equipped on a function expansion board or function expansion unit, which is inserted in or connected to the computer. After that, a CPU or the like equipped on the function expansion board or unit executes some or all of actual processing operations based on instructions of the program code to implement the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-328847 field on Dec. 5, 2006, which is hereby incorporated by reference herein in its entirety.

What is claimed is:

1. An information processing apparatus, comprising:
    a specifying unit that specifies an information collection position on a paper sheet according to encoded information obtained by scanning the paper sheet; and
    an extraction unit that extracts information from the information collection position specified by the specifying unit on the paper sheet,
    wherein the encoded information is allocated at two corners as the cater-cornered positions of a paper sheet, and the encoded information is scanned first and the information collection position is scanned later, from the paper sheet.

2. The apparatus according to claim 1, wherein the encoded information is a two-dimensional barcode.

3. The apparatus according to claim 1, wherein, even if the paper sheet is turned upside down, the encoded information is scanned first and the information collection position is scanned later, from the paper sheet.

4. An information processing method, comprising:
    specifying an information collection position on a paper sheet according to encoded information obtained by scanning the paper sheet; and
    extracting information from the information collection position specified in the specifying step on the paper sheet,
    wherein the encoded information is allocated at two corners as the cater-cornered positions of a paper sheet, and the encoded information is scanned first and the information collection position is scanned later, from the paper sheet.

5. The method according to claim 4, wherein the encoded information is a two-dimensional barcode.

6. The method according to claim 4, wherein, even if the paper sheet is turned upside down, the encoded information is scanned first and the information collection position is scanned later, from the paper sheet.

* * * * *